US010128697B1

(12) United States Patent
Anwer et al.

(10) Patent No.: US 10,128,697 B1
(45) Date of Patent: Nov. 13, 2018

(54) DETECTING AND DETERRING FOREIGN OBJECTS AND LIVING OBJECTS AT WIRELESS CHARGING STATIONS

(71) Applicant: HEVO Inc., Brooklyn, NY (US)

(72) Inventors: Umer Anwer, Niagara Falls (CA); Alap Shah, Jersey City, NJ (US)

(73) Assignee: HEVO, Inc., Brooklyn, NY (US)

( * ) Notice: Subject to any disclaimer, the term of this patent is extended or adjusted under 35 U.S.C. 154(b) by 0 days.

(21) Appl. No.: 15/583,785

(22) Filed: May 1, 2017

(51) Int. Cl.
H02J 50/60 (2016.01)
B60L 11/18 (2006.01)
H02J 50/10 (2016.01)
H04B 5/00 (2006.01)

(52) U.S. Cl.
CPC ............. H02J 50/60 (2016.02); B60L 11/182 (2013.01); B60L 11/1831 (2013.01); H02J 50/10 (2016.02); H04B 5/0043 (2013.01)

(58) Field of Classification Search
CPC .......... H02J 50/60; H04B 5/00; H04B 5/0043
USPC ........................................................ 307/104
See application file for complete search history.

(56) References Cited

U.S. PATENT DOCUMENTS

| 3,801,022 | A | 4/1974 | Cassey et al. |
| 5,264,776 | A | 11/1993 | Hulsey et al. |
| 5,311,973 | A | 5/1994 | Tseng et al. |
| 5,323,099 | A | 6/1994 | Biasotti et al. |
| 5,327,065 | A | 7/1994 | Bruni et al. |
| 5,461,299 | A | 10/1995 | Bruni |
| 5,463,303 | A | 10/1995 | Hall et al. |
| 5,483,143 | A | 1/1996 | Quon et al. |
| 5,498,948 | A | 3/1996 | Davenport et al. |
| 5,506,489 | A | 4/1996 | Abbott et al. |
| 5,600,222 | A | 2/1997 | Woody et al. |
| 5,606,237 | A | 2/1997 | Biasotti et al. |
| 5,646,500 | A | 7/1997 | Wilson et al. |
| 5,654,621 | A | 8/1997 | Seelig et al. |
| 5,703,462 | A | 12/1997 | Woody et al. |
| 5,831,413 | A | 11/1998 | Gould et al. |
| 5,850,135 | A | 12/1998 | Miyazaki et al. |
| 6,157,162 | A | 12/2000 | Hayashi et al. |
| 6,397,990 | B1 | 6/2002 | Brien et al. |
| 6,879,889 | B2 | 4/2005 | Ross et al. |
| 7,741,734 | B2 | 6/2010 | Joannopoulos et al. |
| 7,825,543 | B2 | 11/2010 | Fisher et al. |
| 7,880,337 | B2 | 2/2011 | Farkas |
| D636,333 | S | 4/2011 | Kulikowski et al. |

(Continued)

Primary Examiner — Adi Amrany
(74) Attorney, Agent, or Firm — Kilpatrick Townsend & Stockton LLP

(57) ABSTRACT

Foreign objects at a wireless charging station can be detected and deterred by activating a primary coil in a transmitter to generate an electromagnetic field in response to a receiver being positioned within a predetermined distance from the primary coil. The receiver can be coupled to a battery in an electric vehicle for wirelessly receiving power from the transmitter for charging the battery. A voltage induced on a sensor coil in response to a foreign object being positioned within the electromagnetic field can be measured. The sensor coil can include a first spiral and a second spiral. The first spiral being spiraled in a first direction away from the point and the second spiral being spiraled in a second direction away from the point. The foreign object can be determined to be between the transmitter and the receiver based on the voltage.

30 Claims, 14 Drawing Sheets

(56) References Cited

U.S. PATENT DOCUMENTS

| | | |
|---|---|---|
| 8,022,576 B2 | 9/2011 | Joannopoulos et al. |
| 8,035,255 B2 | 10/2011 | Hall et al. |
| 8,054,036 B2 | 11/2011 | Onishi et al. |
| 8,072,182 B2 | 12/2011 | Vasilantone et al. |
| 8,076,800 B2 | 12/2011 | Joannopoulos et al. |
| 8,076,801 B2 | 12/2011 | Karalis et al. |
| 8,084,889 B2 | 12/2011 | Joannopoulos et al. |
| 8,097,983 B2 | 1/2012 | Fisher et al. |
| 8,106,539 B2 | 1/2012 | Schatz et al. |
| 8,115,448 B2 | 2/2012 | John |
| 8,169,185 B2 | 5/2012 | Partovi et al. |
| 8,183,827 B2 | 5/2012 | Lyon et al. |
| 8,222,860 B2 | 7/2012 | Kamijo et al. |
| 8,304,935 B2 | 11/2012 | Hall et al. |
| 8,324,759 B2 | 12/2012 | Hall et al. |
| 8,362,651 B2 | 1/2013 | Joannopoulos et al. |
| 8,395,282 B2 | 3/2013 | Joannopoulos et al. |
| 8,395,283 B2 | 3/2013 | Joannopoulos et al. |
| 8,400,017 B2 | 3/2013 | Hall et al. |
| 8,400,018 B2 | 3/2013 | Joannopoulos et al. |
| 8,400,019 B2 | 3/2013 | Joannopoulos et al. |
| 8,400,020 B2 | 3/2013 | Joannopoulos et al. |
| 8,400,021 B2 | 3/2013 | Joannopoulos et al. |
| 8,400,022 B2 | 3/2013 | Joannopoulos et al. |
| 8,400,023 B2 | 3/2013 | Joannopoulos et al. |
| 8,400,024 B2 | 3/2013 | Joannopoulos et al. |
| 8,410,636 B2 | 4/2013 | Hall et al. |
| 8,441,154 B2 | 5/2013 | Karalis et al. |
| 8,461,719 B2 | 6/2013 | Schatz et al. |
| 8,461,720 B2 | 6/2013 | Hall et al. |
| 8,461,721 B2 | 6/2013 | Hall et al. |
| 8,461,722 B2 | 6/2013 | Hall et al. |
| 8,463,536 B2 | 6/2013 | Yamamoto |
| 8,466,583 B2 | 6/2013 | Karalis et al. |
| 8,466,654 B2 | 6/2013 | Sieber et al. |
| 8,466,660 B2 | 6/2013 | Robert et al. |
| 8,471,410 B2 | 6/2013 | Hall et al. |
| 8,476,788 B2 | 7/2013 | Hall et al. |
| 8,482,158 B2 | 7/2013 | Hall et al. |
| 8,487,480 B1 | 7/2013 | Schatz et al. |
| 8,497,601 B2 | 7/2013 | Hall et al. |
| 8,513,915 B2 | 8/2013 | Patel et al. |
| 8,517,126 B2 | 8/2013 | Atarashi |
| 8,525,370 B2 | 9/2013 | Walley et al. |
| 8,536,830 B2 | 9/2013 | Holmes et al. |
| D692,010 S | 10/2013 | Verghese |
| 8,552,592 B2 | 10/2013 | Schatz et al. |
| 8,561,770 B2 | 10/2013 | Stoicoviciu |
| 8,569,914 B2 | 10/2013 | Hall et al. |
| 8,569,993 B2 | 10/2013 | Wolfien |
| 8,751,077 B2 | 6/2014 | Hiruta |
| 8,907,811 B2 | 12/2014 | Manniche et al. |
| 9,260,024 B1 * | 2/2016 | Lau .................... B60L 11/1816 |
| 9,446,674 B2 | 9/2016 | Halker |
| 9,640,053 B2 * | 5/2017 | Siann .................. G08B 13/1966 |
| 2001/0002788 A1 | 6/2001 | Koike et al. |
| 2008/0101842 A1 | 5/2008 | Takahashi et al. |
| 2008/0300660 A1 | 12/2008 | John et al. |
| 2009/0249076 A1 | 10/2009 | Reed et al. |
| 2010/0017249 A1 | 1/2010 | Fincham et al. |
| 2010/0094496 A1 | 4/2010 | Hershkovitz et al. |
| 2010/0102640 A1 | 4/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0156346 A1 | 6/2010 | Takada et al. |
| 2010/0161216 A1 | 6/2010 | Yamamoto |
| 2010/0171368 A1 | 7/2010 | Schatz et al. |
| 2010/0181845 A1 | 7/2010 | Fiorello et al. |
| 2010/0185353 A1 | 7/2010 | Barwick et al. |
| 2010/0187911 A1 | 7/2010 | Joannopoulos et al. |
| 2010/0207458 A1 | 8/2010 | Joannopoulos et al. |
| 2010/0219694 A1 | 9/2010 | Kurs et al. |
| 2010/0224900 A1 | 9/2010 | Hiruto et al. |
| 2010/0231340 A1 | 9/2010 | Fiorello et al. |
| 2010/0237709 A1 | 9/2010 | Hall et al. |
| 2010/0259108 A1 | 10/2010 | Giler et al. |
| 2010/0259110 A1 | 10/2010 | Kurs et al. |
| 2010/0277121 A1 | 11/2010 | Hall et al. |
| 2010/0308939 A1 | 12/2010 | Kurs et al. |
| 2011/0043049 A1 | 2/2011 | Karalis et al. |
| 2011/0074218 A1 | 3/2011 | Karalis et al. |
| 2011/0074346 A1 | 3/2011 | Hall et al. |
| 2011/0074347 A1 | 3/2011 | Karalis et al. |
| 2011/0078092 A1 | 3/2011 | Kim et al. |
| 2011/0089895 A1 | 4/2011 | Karalis et al. |
| 2011/0095618 A1 | 4/2011 | Schatz et al. |
| 2011/0121920 A1 | 5/2011 | Kurs et al. |
| 2011/0156494 A1 | 6/2011 | Mashinsky et al. |
| 2011/0193416 A1 | 8/2011 | Campanella et al. |
| 2011/0193419 A1 | 8/2011 | Karalis et al. |
| 2011/0204845 A1 | 8/2011 | Paparo et al. |
| 2011/0221387 A1 | 9/2011 | Steigerwald et al. |
| 2011/0254503 A1 | 10/2011 | Widmer et al. |
| 2011/0285349 A1 | 11/2011 | Widmer et al. |
| 2012/0007441 A1 | 1/2012 | John et al. |
| 2012/0032522 A1 | 2/2012 | Schatz et al. |
| 2012/0062345 A1 | 3/2012 | Kurs et al. |
| 2012/0068549 A1 | 3/2012 | Karalis et al. |
| 2012/0086284 A1 | 4/2012 | Capanella et al. |
| 2012/0086867 A1 | 4/2012 | Kesler et al. |
| 2012/0091794 A1 | 4/2012 | Campanella et al. |
| 2012/0091795 A1 | 4/2012 | Fiorello et al. |
| 2012/0091796 A1 | 4/2012 | Kesler et al. |
| 2012/0091797 A1 | 4/2012 | Kesler et al. |
| 2012/0091819 A1 | 4/2012 | Kulikowski et al. |
| 2012/0091820 A1 | 4/2012 | Campanella et al. |
| 2012/0091949 A1 | 4/2012 | Campanella et al. |
| 2012/0091950 A1 | 4/2012 | Campanella et al. |
| 2012/0098350 A1 | 4/2012 | Campanella et al. |
| 2012/0112531 A1 | 5/2012 | Kesler et al. |
| 2012/0112532 A1 | 5/2012 | Kesler et al. |
| 2012/0112534 A1 | 5/2012 | Kesler et al. |
| 2012/0112535 A1 | 5/2012 | Karalis et al. |
| 2012/0112536 A1 | 5/2012 | Karalis et al. |
| 2012/0112538 A1 | 5/2012 | Kesler et al. |
| 2012/0112691 A1 | 5/2012 | Kurs et al. |
| 2012/0119569 A1 | 5/2012 | Karalis et al. |
| 2012/0119575 A1 | 5/2012 | Kurs et al. |
| 2012/0119576 A1 | 5/2012 | Kesler et al. |
| 2012/0119698 A1 | 5/2012 | Karalis et al. |
| 2012/0139355 A1 | 6/2012 | Ganem et al. |
| 2012/0153733 A1 | 6/2012 | Schatz et al. |
| 2012/0153738 A1 | 6/2012 | Karalis et al. |
| 2012/0153893 A1 | 6/2012 | Schatz et al. |
| 2012/0184338 A1 | 7/2012 | Kesler et al. |
| 2012/0203410 A1 | 8/2012 | Wechlin et al. |
| 2012/0206096 A1 | 8/2012 | John et al. |
| 2012/0228960 A1 | 9/2012 | Karalis et al. |
| 2012/0235500 A1 | 9/2012 | Ganem et al. |
| 2012/0235501 A1 | 9/2012 | Kesler et al. |
| 2012/0235502 A1 | 9/2012 | Kesler et al. |
| 2012/0235503 A1 | 9/2012 | Kesler et al. |
| 2012/0235505 A1 | 9/2012 | Schatz et al. |
| 2012/0235633 A1 | 9/2012 | Kesler et al. |
| 2012/0235634 A1 | 9/2012 | Hall et al. |
| 2012/0235636 A1 | 9/2012 | Partovi et al. |
| 2012/0239117 A1 | 9/2012 | Kesler et al. |
| 2012/0248888 A1 | 10/2012 | Kesler et al. |
| 2012/0256494 A1 | 10/2012 | Kesler et al. |
| 2012/0313449 A1 | 12/2012 | Kurs et al. |
| 2012/0313742 A1 | 12/2012 | Kurs et al. |
| 2013/0007949 A1 | 1/2013 | Kurs et al. |
| 2013/0020878 A1 | 1/2013 | Karalis et al. |
| 2013/0024059 A1 | 1/2013 | Miller et al. |
| 2013/0033118 A1 | 2/2013 | Karalis et al. |
| 2013/0033224 A1 | 2/2013 | Raedy et al. |
| 2013/0033228 A1 | 2/2013 | Raedy et al. |
| 2013/0038276 A1 | 2/2013 | Raedy et al. |
| 2013/0038277 A1 | 2/2013 | Chan et al. |
| 2013/0038402 A1 | 2/2013 | Karalis et al. |
| 2013/0057364 A1 | 3/2013 | Kesler et al. |
| 2013/0062966 A1 | 3/2013 | Verghese et al. |

(56) References Cited

U.S. PATENT DOCUMENTS

| | | |
|---|---|---|
| 2013/0069441 A1 | 3/2013 | Verghese et al. |
| 2013/0069753 A1 | 3/2013 | Kurs et al. |
| 2013/0088195 A1 | 4/2013 | Yoon et al. |
| 2013/0099587 A1 | 4/2013 | Lou et al. |
| 2013/0154389 A1 | 6/2013 | Kurs et al. |
| 2013/0159956 A1 | 6/2013 | Verghese et al. |
| 2013/0169062 A1* | 7/2013 | Maikawa ............... H01F 38/14 307/104 |
| 2013/0181541 A1 | 7/2013 | Karalis et al. |
| 2013/0193913 A1 | 8/2013 | Takada et al. |
| 2013/0234532 A1 | 9/2013 | Fells et al. |
| 2013/0241300 A1* | 9/2013 | Miyamoto ............. H01F 5/003 307/104 |
| 2013/0241302 A1* | 9/2013 | Miyamoto ............. H02J 50/12 307/104 |
| 2013/0249479 A1 | 9/2013 | Partovi et al. |
| 2013/0265004 A1 | 10/2013 | Iizuka et al. |
| 2013/0278073 A1 | 10/2013 | Kurs et al. |
| 2013/0278074 A1 | 10/2013 | Kurs et al. |
| 2013/0278210 A1 | 10/2013 | Cook et al. |
| 2013/0285604 A1 | 10/2013 | Partovi et al. |
| 2013/0300364 A1 | 11/2013 | Baier et al. |
| 2014/0021908 A1 | 1/2014 | McCool et al. |
| 2014/0194092 A1 | 7/2014 | Wanstedt et al. |
| 2014/0239735 A1* | 8/2014 | Abe ...................... B60L 3/0069 307/104 |
| 2015/0015419 A1 | 1/2015 | Halker et al. |
| 2015/0260835 A1* | 9/2015 | Widmer ................. G01S 13/04 342/27 |
| 2015/0276965 A1* | 10/2015 | Turki .................... B60L 11/182 324/207.17 |
| 2015/0362614 A1* | 12/2015 | Obayashi ............... G01V 3/104 324/207.17 |
| 2015/0364944 A1* | 12/2015 | Garcia Briz ........... H02J 7/025 307/104 |
| 2016/0006260 A1* | 1/2016 | Nakamura ............. G01V 3/104 307/104 |
| 2016/0119884 A1* | 4/2016 | Shichino ................ H02J 5/005 307/104 |
| 2016/0170017 A1* | 6/2016 | Ho ......................... G08B 13/1645 342/53 |
| 2016/0380439 A1* | 12/2016 | Shao ...................... H02J 50/12 307/104 |
| 2017/0033609 A1* | 2/2017 | Nakamura ............. B60L 11/182 |
| 2017/0193762 A1* | 7/2017 | Warren .................. G08B 3/10 |
| 2017/0248726 A1* | 8/2017 | Adachi ................... G01V 3/108 |
| 2017/0301201 A1* | 10/2017 | Siann .................... H04N 7/185 |

\* cited by examiner

DETECTING AND DETERRING FOREIGN OBJECTS AND LIVING OBJECTS AT WIRELESS CHARGING STATIONS

TECHNICAL FIELD

The present disclosure relates generally to wirelessly charging an electric vehicle, and more particularly (although not necessarily exclusively), to detecting and deterring foreign objects and living objects at wireless charging stations.

BACKGROUND

One alternative to traditional gasoline-powered vehicles is electrically powered vehicles. Electric vehicles use one or more electric motors, typically powered by batteries for propulsion. The batteries can be charged by one or more sources of electricity. Electric vehicles can be plugged in to a specially designed outlet to receive power for charging the batteries or electric vehicles can be wirelessly charged at a charging station.

SUMMARY

The present disclosure describes devices, systems, and methods for detecting and deterring foreign objects and living objects at wireless charging stations.

In some aspects, a method is provided. The method can include activating a primary coil in a transmitter to generate an electromagnetic field in response to a receiver being positioned within a predetermined distance from the primary coil. The receiver can be coupled to a battery in an electric vehicle for wirelessly receiving power from the transmitter for charging the battery. The method can further include measuring a voltage induced on a sensor coil in response to a foreign object being positioned within the electromagnetic field. The sensor coil can include a first spiral coupled to a second spiral at a point. The first spiral can be spiraled in a first direction away from the point and the second spiral can be spiraled in a second direction away from the point. The method can further include determining the foreign object is between the transmitter and the receiver based on the voltage.

In other aspects, a system is provided. The system can include a sensor coil. The sensor coil can include a first spiral and a second spiral coupled at a point. The first spiral can be spiraled in a first direction away from the point and the second spiral can be spiraled in a second direction away from the point. The sensor coil can be for detecting a foreign object between a primary coil of a wireless electric vehicle charging station and a receiver of an electric vehicle.

In other aspects, a non-transitory computer-readable medium is provided. Instructions can be stored in the non-transitory computer-readable medium and can be executed by a processing device. The instructions can be executed by the processing device for causing the processing device to activate a primary coil in a transmitter to generate an electromagnetic field in response to a receiver being positioned within a predetermined distance from the primary coil. The instructions can also cause the processing device to measure a voltage induced on a sensor coil in response to a foreign object being positioned within the electromagnetic field. The sensor coil can include a first spiral and a second spiral. The first spiral can be spiraled in a first direction away from the point and the second spiral can be spiraled in a second direction away from the point. The instructions can further cause the processing device to determine the foreign object is between the transmitter and the receiver based on the voltage.

The details of one or more aspects and examples are set forth in the accompanying drawings and the description below. Other features and aspects will become apparent from the description, the drawings, and the claims.

DETAILED DESCRIPTION

Figure 1:
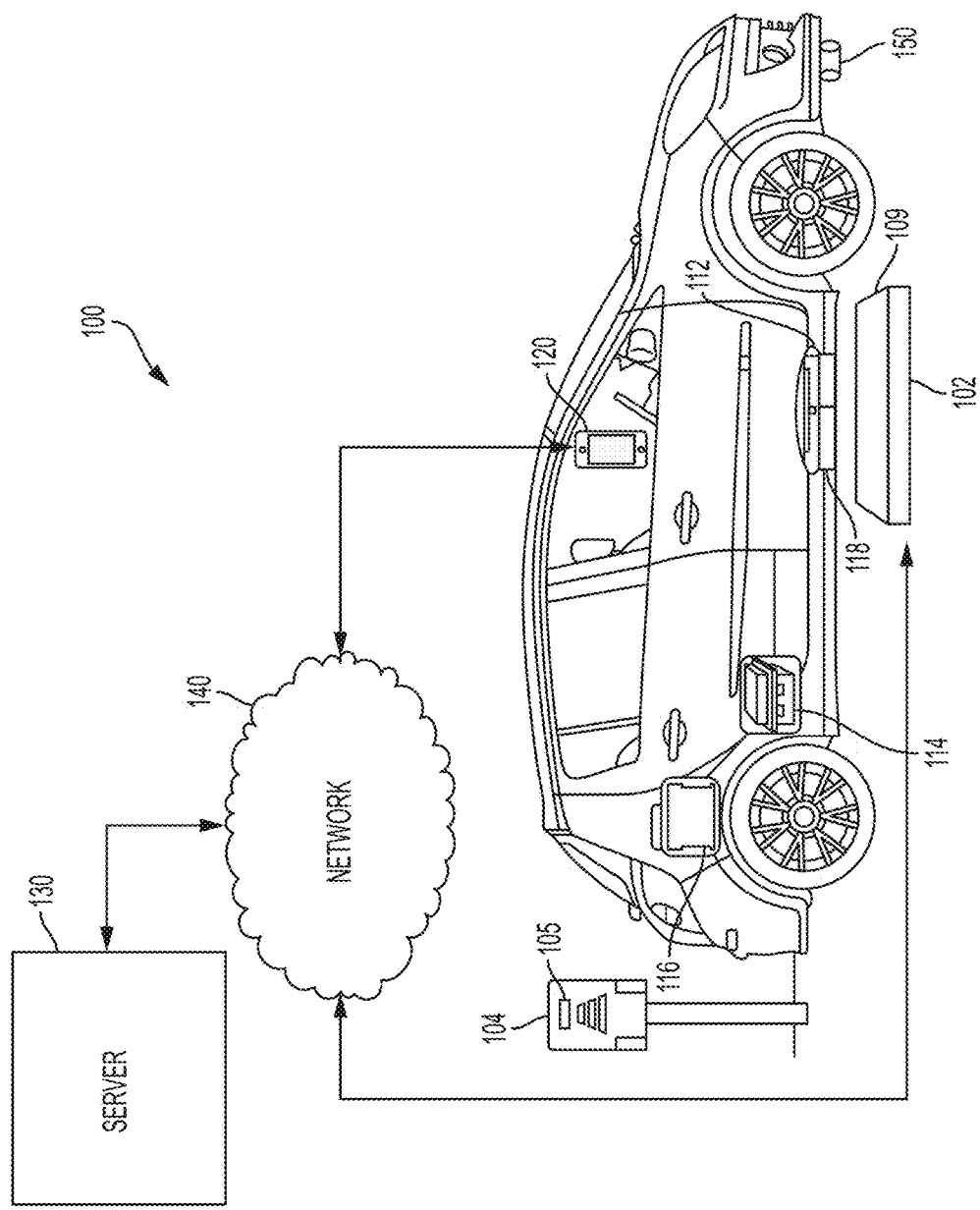
FIG. 1 is a schematic diagram of an example of a wireless charging station for an electric vehicle according to one aspect of the present disclosure.

Certain aspects and features relate to detecting and deterring foreign objects and living objects at a wireless charging station for vehicles. The wireless charging station can include a primary coil for generating an electromagnetic field and the electric vehicle can include a receiver for receiving power from the charging station by being positioned in the electromagnetic field. Hereinafter foreign objects can include both living objects and non-living objects that can distort the electromagnetic field or that can be impacted by being positioned in the electromagnetic field. For example, a metallic object such as a penny can generate heat in response to being positioned in the electromagnetic field, which can absorb some of the energy in the electromagnetic field and reduce the efficiency of a charging operation.

Detecting and deterring foreign objects at a wireless charging station can improve the safety and the efficiency of a wireless charging station. In some aspects, a wireless charging station can include a sensor coil with a double spiral for detecting foreign objects at a wireless charging station. In some examples, using a sensor coil with double spirals can reduce the power usage of a transmitter by reducing the voltage induced on the sensor coil. The double spirals can be balanced such that currents induced on the sensor coil cancel out reducing or eliminating a voltage induced on the sensor coil. Reducing the voltage induced on the sensor coils can allow the transmitter to transfer a greater percentage of the power generated in an electromagnetic field to the receiver.

In additional or alternative aspects, a wireless charging station can communicate with a radar subsystem included in the receiver of the electric vehicle. The radar subsystem can detect foreign objects at the wireless charging station and notify the wireless charging station or a user of the presence of a detected foreign object. The wireless charging station can reduce the number of foreign objects positioned between the transmitter and the receiver by deterring foreign objects using lights, sounds, jets of air, and physical barriers. In some aspects, a wireless charging station can include visual, auditory, and digital alerts for deterring foreign objects or notifying a user to remove the foreign object. In additional or alternative aspects, a wireless charging station can include a retractable cover that can form a barrier preventing foreign objects from being positioned at a wireless charging station.

In additional or alternative aspects, a wireless charging station can communicate with a camera assembly in the receiver of the electric vehicle. The camera assembly can detect foreign objects by visually or thermally scanning an area between the receiver and the wireless charging station. In some examples, a temperature of metal objects rises in response to being positioned in an electromagnetic field produced by the wireless charging station. The camera assembly can detect the metal object by recognizing the rise in temperature. In additional or alternative examples, a living object can have a higher temperature than an environment surrounding the living object. The camera assembly can detect the living object by recognizing a movement of the higher temperature within the environment.

In some aspects, a sensor coil with a double spiral can include a first spiral and a second spiral. The first spiral and the second spiral can be coupled at a point and the spirals can extend from the point in opposite directions. In some examples, the sensor coil can be substantially two-dimensional and can be positioned on a surface of a circuit board. In other examples, the sensor coil can be three-dimensional such that the first spiral and the second spiral pass through a portion of a circuit board. Each spiral can be spiraled in the same direction (e.g., clockwise or counterclockwise) in relation to a center of each spiral. Current can be induced on each of the spirals in response to the sensor coil being positioned in a uniform electromagnetic field. The sensor coil can be balanced such that current induced on the first spiral is equal in magnitude, but in an opposite direction, than current induced on the second spiral. The equivalent opposing currents can negate each other at the point where the spirals are coupled such that a net-zero voltage is induced on the sensor coil. A foreign object (e.g., a metallic object) can disrupt the electromagnetic field such that current induced on one is stronger than a current induced on the other spiral. The different strength currents can produce a non-zero voltage on the sensor coil in response to the foreign object disrupting the electromagnetic field.

A processing device can determine the foreign object is positioned between a transmitter of a wireless charging station and a receiver associated with an electric vehicle based on the voltage induced on the sensor coil. In some aspects, the processing device can use visual alerts (e.g., lights), auditory alerts (e.g., horns), or digital alerts (e.g., signals to a mobile device associated with the receiver) for notifying a user of the presence of the foreign object. In additional or alternative aspects, the processing device can use the alerts to cause a living foreign object (e.g., a child) to move from the area between the transmitter and the receiver. For example, horns and flashing lights can deter a living object from remaining in the area. In additional or alternative aspects, the processing device can activate an air jet or an air pump for using air to cause the foreign object to move. For example, the air jet deters a living object (e.g., a rabbit) from remaining in the area by blowing jets of air at the living object. In another example, the air jet blows a non-living object (e.g., a metallic object) from the area using jets of air.

In additional or alternative aspects, the processing device can determine the foreign object is between the transmitter and the receiver based on movement data measured by a radar subsystem. The radar subsystem can transmit a signal and receive a reflection of the signal generated by the signal contacting the foreign object. The radar subsystem can determine movement data about the foreign object based on changes in the reflection of the signal. In some examples, the radar subsystem can be used to detect living objects such as animals or children. The wireless charging station can include auditory alerts in response to detecting a living object. In some examples, the auditory alerts can include instructions to the living object to move outside of the area between the transmitter and the receiver. In additional or alternative examples, the auditory alert can include a siren deterring the living object from being positioned in the area between the transmitter and the receiver.

In additional or alternative aspects, the processing device can determine the foreign object is between the transmitter and the receiver based on data from a camera assembly. The camera assembly can capture and image of the area between the transmitter and the receiver. In some aspects, the image is a thermal image indicating temperatures in the area between the transmitter and the receiver. The camera assembly can transmit a signal based on the image to the processing device. In some examples, the processing device recognizes an area of higher temperature as a foreign object. In additional or alternative examples, the processing device detects a foreign object based on changes in temperature between a series of thermal images captured by the camera assembly.

A wireless charging station can include a retractable cover or a shutter coupled to the transmitter or the receiver. The retractable cover can move between a closed position and an open position based on the receiver being within a predetermined distance from the transmitter. In some examples, a retractable cover coupled to a transmitter positioned under a driving surface can protect the transmitter in the closed position. The retractable cover can open in response to the receiver being within a predetermined distance (e.g., five meters) of the transmitter. In the open position, the retractable cover can form a physical barrier preventing a foreign object from being positioned between the transmitter and the receiver. In additional or alternative examples, the retractable cover can include light-emitting diodes ("LEDs") that can activate to deter foreign objects from being positioned between the transmitter and the receiver.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

FIG. 1 is a schematic diagram of a wireless charging station 100 for an electric vehicle. The wireless charging station 100 includes a transmitter 102 as part of a charging station for wirelessly transmitting power to a receiver 112. The transmitter 102 can include a primary coil for generating an electromagnetic field that can produce a voltage at the receiver 112. In some aspects, the transmitter 102 can be positioned flush with a driving surface. In additional or alternative aspects, the transmitter 102 can be positioned below the driving surface, positioned such that the transmitter 102 extends from the driving surface, positioned on a wall adjacent to the driving surface, or suspended above the driving surface.

The transmitter 102 can include one or more sensor coils or a radar subsystem for detecting foreign objects at the charging station. In some aspects, the sensor coils can be included on a circuit board positioned between the primary coil and the receiver 112. The sensor coils can each include a first spiral and a second spiral coupled at a point. The first spiral can be spiraled in a first direction away from the point and the second spiral spiraled in a second direction away from the point. The electromagnetic field generated by the primary coil can induce a current on the first spiral that has an opposite direction of a current induced on the second spiral. The two opposing currents can result in a net zero voltage induced on the sensor coil if the two currents have the same magnitude. A foreign object (e.g., a metallic object) can distort the electromagnetic field and cause the current induced on one spiral to be greater than the current induced on the other spiral. In response to the difference in currents generated on the two spirals, a voltage can be induced on the sensor coil. A processing device in the transmitter 102 can measure the voltage and determine the foreign object is between the transmitter 102 and the receiver 112.

In additional or alternative aspects, a radar subsystem can be communicatively coupled to the processing device and measure movement data about the foreign object (e.g., a living object). The processing device can use the movement data to determine the foreign object is between the transmitter 102 and the receiver 112.

In additional or alternative aspects, a camera assembly 150 can be communicatively coupled to the processing device and capture images (e.g., thermal images) of an area between the transmitter 102 and the receiver 112. The camera assembly 150 can be rotatable between a closed position for protecting an image or thermal capture device (e.g., a camera) positioned in the camera assembly 150 and an open position for directing a field of view of the image or thermal capture device at the area between the transmitter 102 and the receiver 112. The processing device can analyze the images or data based on the images to determine a foreign object is positioned between the transmitter 102 and the receiver 112. Although FIG. 1 depicts the camera assembly 150 as physically separate from the receiver 112, the camera assembly 150 can be included in the receiver 112 or communicatively coupled to the receiver 112. In other examples, the camera assembly 150 can be coupled to the transmitter 102 or another component of the wireless charging station 100.

The processing device can generate alerts (e.g., visual alerts, auditory alerts, or digital alerts) to notify a user associated with the receiver 112 that the foreign object is positioned between the transmitter 102 and the receiver 112. In some examples, the transmitter 102 can include a communication device (e.g., a radio or Bluetooth transmitter) for transmitting digital alerts to a mobile device 120 associated with the receiver 112 indicating a foreign object is positioned between the transmitter 102 and the receiver 112.

The transmitter 102 can include LEDs 109 for deterring foreign objects from being positioned between the transmitter 102 and the receiver 112. The LEDs 109 can strobe or flash prior or during a charging process to deter foreign objects (e.g., animals or users) from being positioned on or near the transmitter 102. In additional or alternative examples, the transmitter 102 can include LEDs 109 for conveying information to a user of the electric vehicle. The LEDs 109 can activate at a predetermined rate, color, or pattern to indicate to a user that a foreign object (e.g., a coin) is positioned in a charging field of the transmitter 102. In additional or alternative examples, the LEDs 109 can indicate the transmitter 102 is available for charging the receiver 112. In additional or alternative examples, the LEDs can signal to a user that the transmitter 102 is reserved.

In some aspects, the transmitter 102 can include a coating for protecting components in an inner area of the transmitter 102. The coating can be waterproof, fire resistant, and shock absorbent for withstanding the weight of an electric vehicle. In some examples, the coating is nonmetallic (e.g., rubber) to prevent the coating from interfering with an electromagnetic field generated with by the transmitter 102.

The receiver 112 can be communicatively coupled to a battery management system ("BMS") 114 of an electric vehicle. The power received by the receiver 112 can be transmitted to the BMS 114 for charging a battery 116 of the electric vehicle. In some examples, the BMS 114 can be hardwired to the battery 116 and receiver 112. In additional or alternative examples, the BMS 114 can wirelessly receive the power from the receiver 112 or wirelessly transmit the power to the battery 116.

In some aspects, the receiver 112 can include retractable cover 118. The retractable cover 118 can move between a closed position (as depicted in FIG. 1) and an open position. In the closed position, the retractable cover 118 can protect the receiver 112. The retractable cover 118 can pivot to an open position such that any foreign objects stuck to the retractable cover 118 or the undercarriage of the vehicle can be moved out of the charging path between the transmitter 102 and the receiver 112. In additional or alternative examples, the retractable cover 118 can be retracted or collapsed in the open position. The retractable cover 118 can include LEDs for providing a visual alert to notify a user of a foreign object or to deter the foreign object. For example, the LEDs can strobe or flash to encourage the foreign object (e.g., a living object) to move to a position outside of the electromagnetic field generated by the transmitter 102.

In some aspects, an air pump (not depicted) can be included in the transmitter 102, receiver 112, or coupled to another component in the wireless charging station 100. The air pump can produce jets of air for deterring foreign objects from remaining in an area between the transmitter 102 and the receiver 112.

Although FIG. 1 depicts the retractable cover 118 as being included in the receiver 112, other implementations are possible. For example, the transmitter 102 can include a retractable cover that can move between an open position and a closed position. The transmitter 102 can be positioned such that the retractable cover, in the closed position, is flush with the driving surface. The retractable cover can move to an open position in response to the receiver 112 being positioned within a predetermined range (e.g., 5 meters) of the transmitter 102 or in alignment with the transmitter 102. In some examples, the retractable cover can pivot to an open position such that any foreign objects on the outer surface of the retractable cover are moved to a position outside of the area between the transmitter 102 and the receiver 112. The retractable cover can create a barrier preventing foreign objects from being positioned in the area between the transmitter 102 and the receiver 112. In additional or alternative examples, the retractable cover can be retracted or collapsed in the open position such that the driving surface remains free of obstructions.

The wireless charging station 100 can include the mobile device 120 and a server 130 that can be communicatively coupled with the transmitter 102 by a network 140 (e.g., a cellular network or an internet network). In some aspects, the mobile device 120 can be a user device associated with a user associated with the electric vehicle. In additional or alternative aspects, the mobile device 120 can be built into the electric vehicle. The mobile device 120 can be communicatively coupled to the receiver 112 or BMS 114 using a short-range wireless communication protocol. In some aspects, the mobile device 120 can be communicatively coupled to the transmitter 102 using a short-range wireless communication protocol in response to the electric vehicle being within a threshold distance of the charging station.

The wireless charging station 100 can also include an inverter enclosure 104 that can indicate that the wireless charging station 100 has detected a foreign object. In some aspects, the inverter enclosure 104 can include a bar of LEDs 105 that can indicate a status of the transmitter 102. In some examples, the LEDs 105 can indicate the presence of a foreign object between the transmitter 102 and the receiver 112 by activating at a predetermined rate, color, or pattern. In additional or alternative aspects, the LEDs 105 can indicate the presence and status of retractable cover 118. Although a bar of LEDs 105 is depicted in FIG. 1, individual LEDs can be included in the inverter enclosure 104. In additional or alternative aspects, the inverter enclosure 104 can include a high frequency inverter, a communications gateway, and an input power controller. For example, the inverter enclosure 104 can include an EMI filter, a power supply, an input meter, a circuit breaker, a gateway controller, an inverter, a primary side power stage, a primary side power controller, transformers, and a heat sink. In some examples, the transmitter 102, inverter enclosure 104, or server 130 can communicate with the mobile device 120 to notify a user that a foreign object has been detected.

Although FIG. 1 depicts the wireless charging station 100 for charging a user-controlled vehicle, a wireless charging station can be used to charge an autonomous vehicle. An autonomous vehicle can receive information regarding available transmitters over a cellular network. The autonomous vehicle can transmit a signal to the wireless charging station to reserve an available transmitter. The autonomous vehicle can use the information received to determine and navigate a route to the available transmitter. Once the autonomous vehicle is within a predetermined range of the transmitter 102, the autonomous vehicle can receive alignment data and analyze the alignment data to determine movements that can position the autonomous vehicle such that a receiver in the autonomous vehicle is aligned with the available transmitter. The autonomous vehicle can execute the movements and determine the transmitter is in alignment with the receiver. In some examples, the autonomous vehicle can receive a signal indicating the receiver and transmitter are aligned from the transmitter. The autonomous vehicle can request that the transmitter charge the receiver, monitor the charging progress, and request that the charging process stop after a threshold value is met. In some examples, the autonomous vehicle can detect the foreign object and transmit a signal to the wireless charging station 100. In additional or alternative examples, the autonomous vehicle can receive a digital alert indicating a foreign object is detected and move to another charging station.

Although FIG. 1 depicts a retractable cover 118 with two retractable portions, any number of retractable covers having any number or shape of retractable portions can be included in a wireless charging station. In some examples, a transmitter can include a retractable cover with four triangular retractable portions. In additional or alternative examples, a transmitter can include more than one layer of retractable covers such that a second layer of retractable covers is closer to the transmitter and can move to an open position in response to the first layer moving to an open position.

Figure 2:
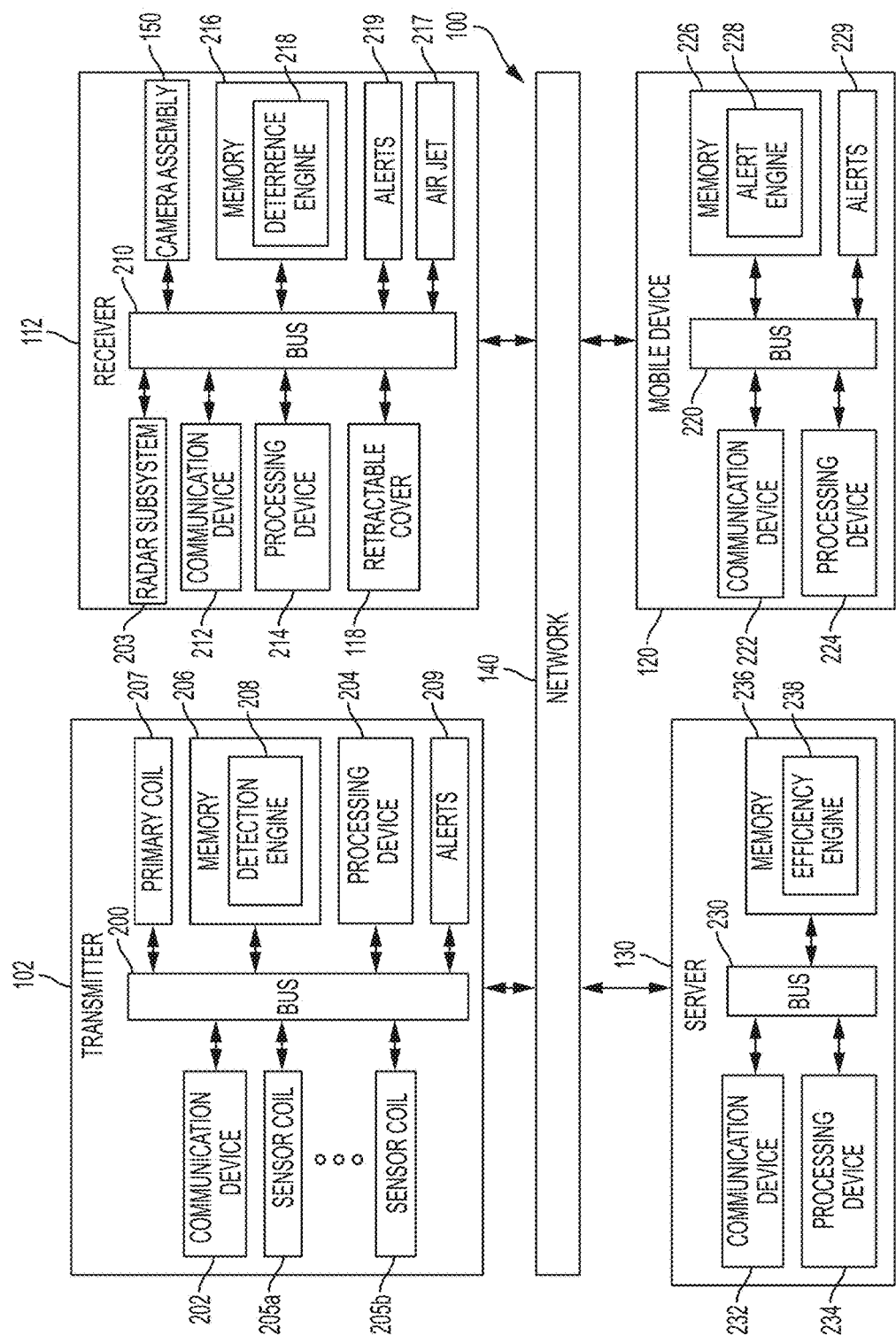
FIG. 2 is a block diagram of a wirelessly charging station for an electric vehicle according to one aspect of the present disclosure.

FIG. 2 is a block diagram of the wireless charging station 100 in FIG. 1 according to one example. The wireless charging station 100 can include a transmitter 102, a receiver 112, a mobile device 120, and a server 130 communicatively coupled by a network 140.

The transmitter 102 can include a communication device 202, a processing device 204, a memory 206, sensor coils 205a-b, a primary coil 207, and alerts 209. Each component of the transmitter 102 can be communicatively coupled by a bus 200.

The sensor coils 205a-b can be positioned in a charging path between the primary coil 207 and the receiver 112. The sensor coils 205a-b can each include a first spiral spiraled in a first direction and a second spiral spiraled in a second direction. In some examples, the primary coil 207 can be activated to a lower power state (e.g., 40 W) in response to determining the receiver 112 is within a predetermined distance (e.g., 5 meters) from the transmitter 102. The electromagnetic field generated by the primary coil 207 can induce a current in each spiral of each of the sensor coils 205a-b. The sensor coils 205a-b can be balanced such that the electromagnetic field generates two equal magnitude currents having opposite sign in each of the sensor coils 205a-b. A net zero voltage can be induced on the sensor coils 205a-b as a result of the electromagnetic field. A foreign object (e.g., a metallic object) positioned in the electromagnetic field can cause a difference in the magnitude of the current induced on one spiral relative to the other spiral. A non-zero net voltage can be induced on the sensor coils 205a-b in response to the foreign object being positioned in the electromagnetic field. The processing device 204 can be communicatively coupled to the sensor coils 205a-b for measuring the voltage and determining the foreign object is positioned between the transmitter 102 and the receiver 112.

In some aspects, the transmitter 102 can include a retractable cover that can be positioned between the primary coil 207 and the receiver 112 for protecting the transmitter 102 in a closed position. In some examples, the retractable cover can be treated in a waterproof coating for preventing fluids (e.g., rain). The retractable cover can move to an open position in response to the receiver 112 moving within a predetermined distance of the transmitter 102. In the open position, the retractable cover can form a physical barrier for preventing foreign objects from being positioned between the transmitter 102 and the receiver 112.

In some aspects, the communication device 202 can include (or be communicatively coupled to) a radio for transmitting FM or AM signals to another radio included in (or communicatively coupled to) the receiver 112. The radio can transmit signals based on the processing device 204 determining that the foreign object is positioned between the transmitter 102 and the receiver 112. In some examples, the communication device 202 can transmit radio or other short-range signals (e.g., Bluetooth) to a communication system in an electric vehicle (e.g., a radio). The communication system in the vehicle can provide voice or visual notification of the foreign object to the user. In some examples, the instructions can facilitate removal of the foreign object. In additional or alternative examples, the instructions can facilitate the electric vehicle moving to a different transmitter.

The primary coil 207 can generate a stronger electromagnetic field in a higher power state and induce a voltage on the receiver 112 for charging an electric vehicle associated with the receiver 112. In response to detecting a foreign object in the charging path between the transmitter 102 and the receiver 112, the power provided to the primary coil 207 can be reduced or the primary coil 207 can be deactivated.

The processing device 204 can execute program code stored in the memory 206. Examples of the processing device 204 can include a microprocessor, an application-specific integrated circuit ("ASIC"), a field-programmable gate array ("FPGA"), or other suitable processing device. The processing device 204 can include (or be communicatively coupled to) a non-transitory computer readable memory 206. The memory 206 can include one or more memory devices that can store program instructions. The program instructions can include, for example, a detection engine 208 that is executable by the processing device 204 to perform certain operations described herein. For example, the operations can include activating the primary coil 207 to produce an electromagnetic field that can wirelessly transfer power to the receiver 112. In additional or alternative examples, the operations can include determining a foreign object is positioned between the transmitter 102 and the receiver 112 based on the sensor coils 205a-b or the radar subsystem 203.

The receiver 112 can include a communication device 212, a processing device 214, a memory 216, alerts 219, a retractable cover 118, a radar subsystem 203, an air jet 217, and a camera assembly 150 each of which can be communicatively coupled by a bus 210. The communication device 212 can communicatively couple to the transmitter 102 for receiving digital alerts indicating a foreign object is positioned between the transmitter 102 and the receiver 112. In some aspects, the communication device 212 can be communicatively coupled to the transmitter 102 for receiving a signal indicating the receiver 112 is within a predetermined distance of the transmitter 102. In some examples, the retractable cover 118 can move from a closed position to an open position in response to receiving the signal. In a closed position, the retractable cover 118 can protect the receiver 112 from debris. In an open position, the retractable cover 118 can form a barrier for preventing foreign objects from being positioned between the receiver 112 and the transmitter 102.

In some aspects, the air jet 217 can be coupled to an undercarriage of an electric vehicle with the receiver 112. In additional or alternative aspects, the air jet 217 can be included in the camera assembly 150 or the retractable cover 118. The air jet 217 can rotate between a closed position and an open position in response the receiver 112 being within a predetermined distance of the transmitter 102. In some examples, the air jet 217 includes a pump and a tank for generating and storing pressurized air. The air jet 217 can release the pressurized air in a stream for blowing foreign objects out of an area between the transmitter 102 and the receiver 112.

In some aspects, the communication device 212 can include (or be communicatively coupled to) a radio for receiving FM or AM radio signals from the transmitter 102. The radio can be tuned to a particular frequency broadcast by the transmitter 102 and provide oral instructions to a user notifying the user of a foreign object positioned between the transmitter 102 and the receiver 112. In some examples, the particular frequency can be displayed to the user by the mobile device 120.

The processing device 214 can include (or be communicatively coupled to) a non-transitory computer readable memory 216. The memory 216 can include one or more memory devices that can store program instructions. The program instructions can include, for example, a deterrence engine 218 that is executable by the processing device 214 to perform certain operations described herein. For example, the operations can include deterring foreign objects from being positioned between the transmitter 102 and the receiver 112. The operations can cause the retractable cover 118 to move from a closed position to an open position.

The mobile device 120 can include a communication device 222, a processing device 224, a memory 226, and alerts 229. A bus 220 can communicatively couple the components. The communication device 222 can communicatively couple to the transmitter 102, receiver 112, or the server 130 over a cellular network, a short-range wireless communication protocol, or any other suitable communication method.

In some aspects, the radar subsystem 203 can transmit a signal toward the receiver 112 in response to the receiver 112 being within a predetermined distance (e.g., 25 meters) from the transmitter 102. The radar subsystem 203 can receive a reflection of the signal generated by the signal contacting a foreign object. The processing device 214, the processing device 204, or a processing device included in the radar subsystem 203 can determine data indicating a movement of a foreign object based on a difference in the signal and the reflection. In some examples, the processing device 204 can use the voltages from the sensor coils 205a-b and the data from the radar subsystem 203 to determine a foreign object is positioned between the transmitter 102 and the receiver 112.

In some aspects, the camera assembly 150 can capture an image of the area between the transmitter 102 and the receiver 112. In some examples, the processing device 214, the processing device 204, or a processing device included in the camera assembly 150 can determine thermal data about the area between the transmitter 102 and the receiver 112. In additional or alternative examples, the processing device 204 can use the voltages from the sensor coils 205a-b, the data from the radar subsystem 203, and the thermal data from the camera assembly 150 to determine a foreign object is positioned between the transmitter 102 and the receiver 112.

The processing device 224 can include (or be communicatively coupled to) a non-transitory computer readable memory 226. The memory 226 can include one or more memory devices that can store program instructions. The program instructions can include, for example, an alert engine 228 that is executable by the processing device 224 to perform certain operations described herein. For example, the operations can include displaying digital alerts to a user based on a foreign object being detected between the transmitter 102 and the receiver 112. The digital alert can include a description (e.g., the size, the shape, or the location) of the foreign object. In additional or alternative examples, the operation can include generating an auditory alert or haptic effect to notify the user of the foreign object.

The server 130 can include a communication device 232, a processing device 234, and a memory 236. A bus 230 can communicatively couple the components of the server 130. In some aspects, the server 130 can receive information about a foreign object detection event via the network 140. The server 130 can maintain a database of foreign object detection events for the transmitter 102.

The processing device 234 can include (or be communicatively coupled to) a non-transitory computer readable memory 236. The memory 236 can include one or more memory devices that can store program instructions. The program instructions can include, for example, an efficiency engine 238 that is executable by the processing device 234 to perform certain operations described herein. For example, the operations can include receiving information about a foreign object detection event and recording the information in a database. The information can include the time the foreign object was detected, the shape or size of the foreign object, the time the foreign object was removed, and the location of the transmitter 102. In additional or alternative examples, the operations can include identifying a reoccurring foreign object and notifying an operator with a description of the foreign object to facilitate deterring the foreign object from being positioned between the transmitter 102 and the receiver 112. For example, the operations can include compiling information from a plurality of transmitters and analyzing the information to determine an average frequency of detecting foreign objects at a transmitter. The processing device 234 can alert an operator of a specific transmitter based on a frequency of detecting foreign objects at the specific transmitter exceeding the average frequency of detecting foreign objects.

Figure 3:
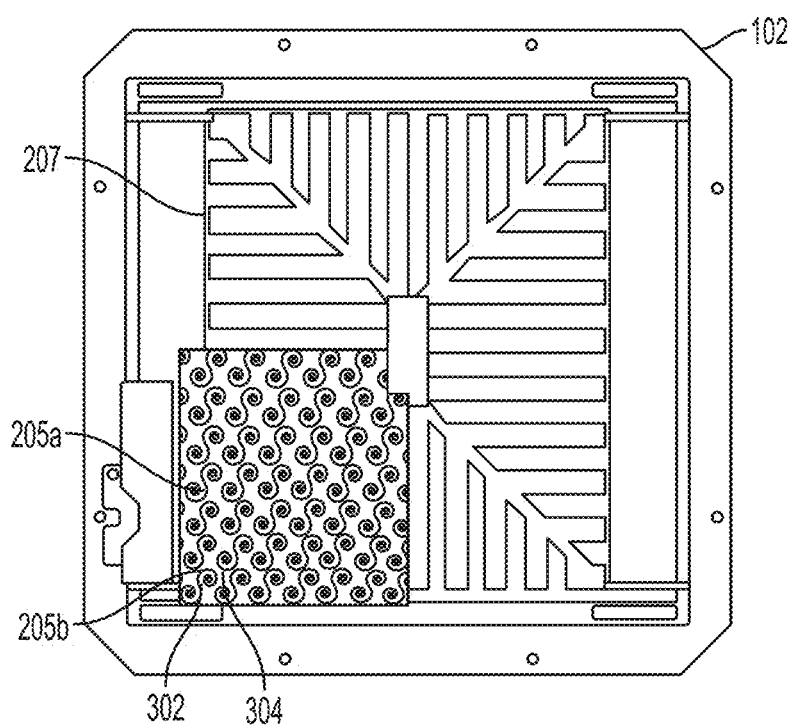
FIG. 3 is a schematic diagram of a transmitter with double-spiral sensor coils according to one aspect of the present disclosure.

FIG. 3 is a schematic diagram of a cross-sectional view of the transmitter 102 in FIGS. 1-2 with sensor coils 205a-b. The transmitter 102 can include more than one layer of components. The sensor coils 205a-b can be positioned on a different layer than the primary coil 207 and closer to the receiver 112 than the primary coil 207. For example, the transmitter 102 can be positioned below an electric vehicle having the receiver 112 and the sensor coils 205a-b can be positioned above the primary coil 207. The sensor coils 205a-b can each be positioned on a single layer or a single plane parallel to the primary coil 207.

In some aspects, the sensor coils 205a-b can be double-spiraled sensor coils each including a first spiral 302 spiraled in a first direction and a second spiral 304 spiraled in a second direction. The double-spiraled sensor coils can be balanced in that the first spiral 302 and second spiral 304 produce equal and opposite currents that cancel out in response to being positioned in a uniform electromagnetic field. A voltage can be induced on the sensor coils 205a-b in response to the electromagnetic field being deformed by the presence of a foreign object. The voltage induced on each sensor coil can be measured and analyzed to determine if a foreign object is positioned between the primary coil 207 and the receiver 112.

Although FIG. 3 depicts the sensor coils 205a-b positioned in a single quadrant of the transmitter 102, sensor coils can be positioned throughout a transmitter. In some examples, sensor coils are positioned in more than one layer and staggered such that the center of a sensor coil in one layer aligned with a center of a spiral of a sensor coil in another layer.

Figure 4:
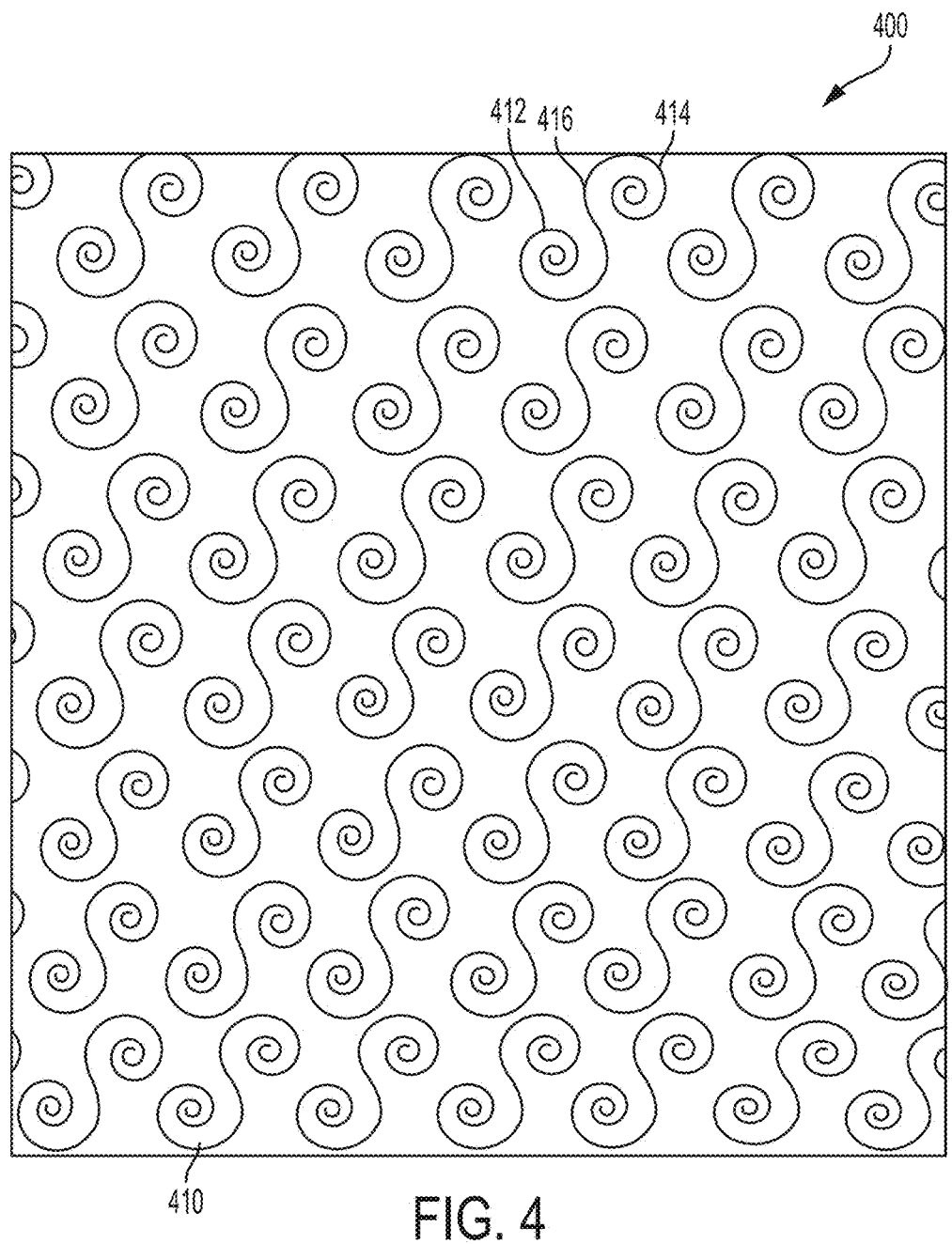
FIG. 4 is a schematic diagram of a double-spiral sensor-coil array according to one aspect of the present disclosure.

FIG. 4 is a schematic diagram of a double-spiral sensor-coil array 400 including sensor coils 410. In some examples, sensor coils 410 are an example of the sensor coils 205 in FIGS. 2-3, but other implementations are possible. Each of the sensor coils 410 includes a first spiral 412 spiraled in a first direction and a second spiral 414 spiraled in a second direction. The first spiral 412 and the second spiral 414 can be coupled at a point 416 on each of the sensor coils 410. In this example, the first spiral 412 and the second spiral 414 extend in opposite direction from the point and are both spiraled clockwise towards a center of each spiral. The sensor coils 410 can be balanced such that no current is present at the point 416 while the sensor coil 410 is in a uniform electromagnetic field. For example, a uniform electromagnetic field passing through the sensor coils 410 can generate a counterclockwise current of equal magnitude in both the first spiral 412 and the second spiral 414. The point 416 is positioned to the right of a center of the first spiral 412 and to the left of the second spiral 414 such that the current from the first spiral 412 is travelling in an opposite direction of the current from the second spiral at the point 416. The two currents having equal magnitude but opposite direction can negate each other at the point 416 such that no current is present at point 416.

A non-uniform electromagnetic field can induce currents of different magnitude on the first spiral 412 and the second spiral 414. The imbalance in induced currents can result in current being induced at the point 416 such that a voltage can be measured on the sensor coils 410. A processing device can measure the current or the voltage to determine that a foreign object is disrupting the electromagnetic field. Although the first spiral 412 and the second spiral 414 in FIG. 4 are depicted as including two revolutions or loops, sensor coils can include spirals with one loop or more than two loops. In some aspects, the sensor coil can include more than two balanced spirals coupled at the point 416.

Although FIG. 4 depicts an array of sensor coils, any number of sensor coils, including one, can be used by a transmitter. In some aspects, an array of sensor coils can be positioned on different horizontal planes parallel to a primary coil. For example, the sensor coils can be on different parallel planes and staggered such that a center of a sensor coil on one layer is aligned with the center of a spiral of a sensor coil in another layer. In additional or alternative aspects, a sensor coil can be positioned on a circuit board with a radar subsystem. A processing device can use measurements from the sensor coil and the radar subsystem to detect a foreign object at a wireless charging station.

Figure 11:
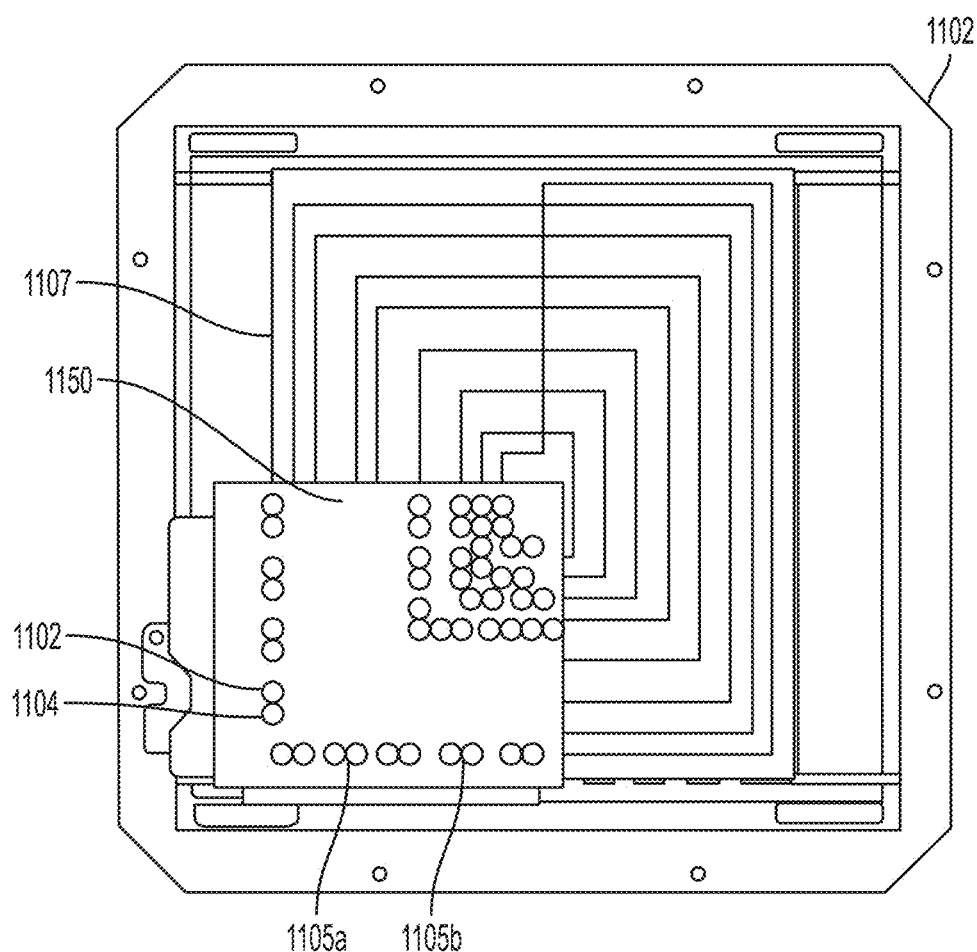
FIG. 11 is a schematic diagram of an example of a transmitter with double-spiral sensor coils aligned with a litz wire of the transmitting coil according to one aspect of the present disclosure.

FIG. 11 is a schematic diagram of a cross-sectional view of another transmitter 1100 with sensor coils 1105a-b. The transmitter 1100 can include more than one layer of components. The sensor coils 1105a-b can be positioned on a different layer than the primary coil 1107 and closer to a receiver than the primary coil 1107. In some examples, the sensor coils 1105a-b can be positioned on a single layer or a single plane parallel to the primary coil 1107 and can be aligned with a litz wire of the primary coil 1107. In additional or alternative examples, a width of the sensor coils 1105a-b can be less than or equal to a width of the litz wire of the primary coil 1107.

In some aspects, the sensor coils 1105a-b can be double-spiraled sensor coils and each can include a first spiral 1102 spiraled in a first direction and a second spiral 1104 spiraled in a second direction. The double-spiraled sensor coils can be balanced in that the first spiral 1102 and second spiral 1104 produce equal and opposite currents that cancel out in response to being positioned in a uniform electromagnetic field. A voltage can be induced on the sensor coils 1105a-b in response to the electromagnetic field being deformed by the presence of a foreign object. The voltage induced on each sensor coil can be measured and analyzed to determine if a foreign object is positioned between the primary coil 1107 and a receiver.

In additional or alternative aspects, a diode can be electrically coupled in series with each of the sensor coils 1105a-b. The diode can allow each of the sensor coils 1105a-b to be analyzed without affecting (e.g., by causing a short circuit) the other sensor coils 1105a-b. In some examples, sensor coils 1105a-b in a 10×10 array of sensor coils 1105a-b can be individually monitored using 20 wires. A bias can be applied to each of the sensor coils 1105a-b to prevent any sinusoidal signals generated on the sensor coils 1105a-b from being half-wave rectified by the diode.

Although FIG. 11 depicts the sensor coils 1105a-b positioned in a single quadrant of the transmitter 1100, sensor coils can be positioned throughout a transmitter. In some examples, sensor coils are positioned in more than one layer and staggered such that the center of a sensor coil in one layer is aligned with a center of a spiral of a sensor coil in another layer.

Figure 12:
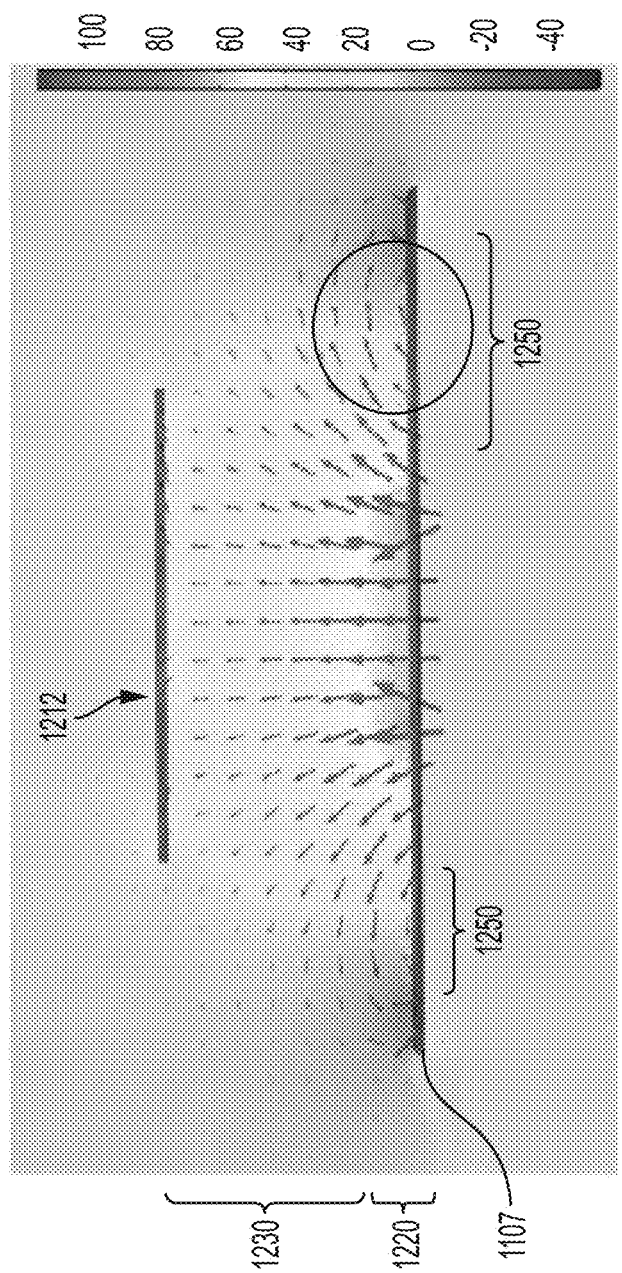
FIG. 12 is a graph of an example of a magnetic field between a transmitter and a receiver according to one aspect of the present disclosure.

In FIG. 11, the sensor coils 1105a-b are positioned across the layer such that a greater density of sensor coils 1105a-b are positioned in alignment with a center of the primary coil 1107 and an outer edge of the primary coil 1107 than an inner ring 1150. As depicted in FIG. 12, an electromagnetic field generated by the primary coil 1107 can be substantially parallel to the primary coil 1107 within a ring 1250 of the primary coil 1107. Eddy currents may be induced on metallic objects positioned in portions of the electromagnetic field with a direction that is parallel to the primary coil 1107. To improve efficiency and accuracy of foreign object detection, fewer sensor coils 1105a-b may be aligned with portions of the primary coil 1107 that are aligned with these sections of the electromagnetic field. FIG. 12 also depicts two regions 1220, 1230 between the primary coils 1107 and a receiver 1212. One region 1220 is closer to the primary coil 1107 than the other region 1230. Foreign objects positioned in the region 1220 closer to the primary coil 1107, may be accurately detected by sensor coils 1105a-b by generating a stronger current on the sensor coils 1105a-b. In some examples, a foreign object (e.g., a yogurt container) may have a non-metallic portion positioned in region 1220 and a metallic portion positioned in region 1230. The current induced on the sensor coils 1105a-b may be too weak to accurately detect the foreign object. A wireless charging system can also include a camera assembly that accurately detects foreign objects in the region 1220 and in region 1150. The wireless charging system can use data from the camera assembly and the sensor coils 1105a-b to more accurately detect and deter foreign objects throughout the area between the primary coil 1107 and the receiver 1212.

Figure 13:
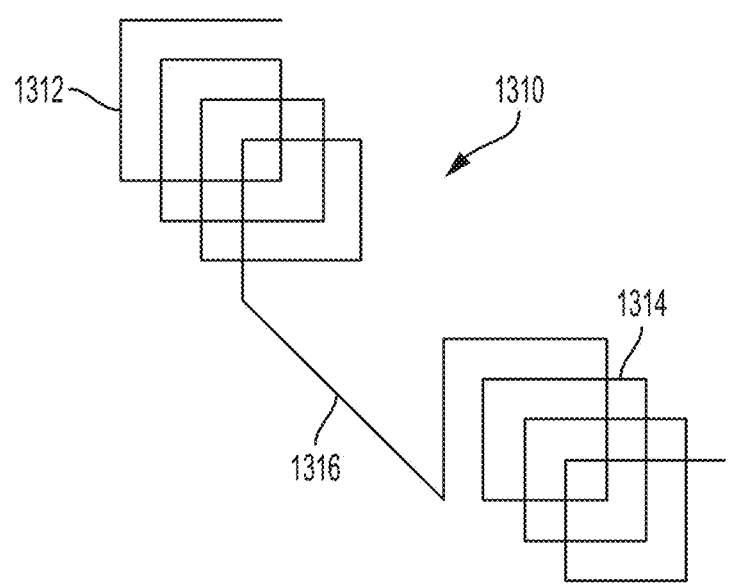
FIG. 13 is a schematic diagram of an example of a three-dimensional double-spiral sensor coil according to one aspect of the present disclosure.

FIG. 13 is a schematic diagram of an example of a three-dimensional double-spiral sensor coil 1310. The double-spiral sensor coil 1310 can include a first spiral 1312 spiraled in a first direction and a second spiral 1314 spiraled in a second direction. The first spiral 1312 and the second spiral 1314 can be coupled at a point 1316. In this example, the first spiral 1312 and the second spiral 1314 extend in opposite direction from the point 1316 and are both spiraled counter-clockwise towards the point 1316. The double-spiral sensor coil 1310 can be balanced such that no current is present at the point 1316 while the double-spiral sensor coil 1310 is in a uniform electromagnetic field. In some examples, a trace for the double-spiral sensor coil 1310 can be positioned on two sides of a PCB and pass through vias in the PCB to form a continuous loop around the dielectric.

Figure 5:
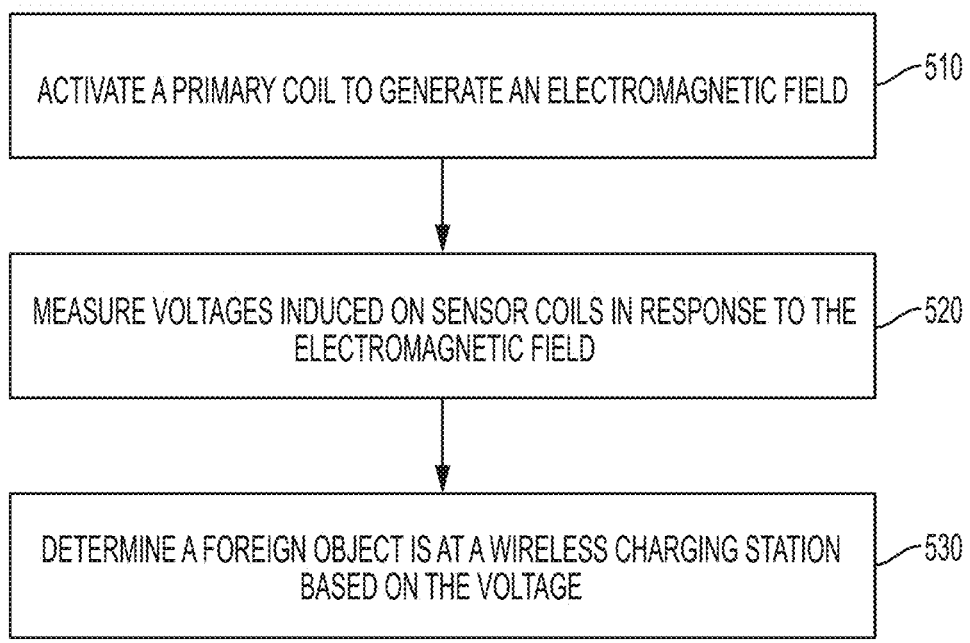
FIG. 5 is a flowchart of an example of a process for detecting foreign objects at a wireless charging station with a double-spiral sensor coil according to one aspect of the present disclosure.

FIG. 5 is a flow chart depicting a process for detecting a foreign object at a wireless charging station using a double-spiraled sensor coil. The process is described with respect to the wireless charging station 100 in FIGS. 1-2 and the transmitter 102 in FIG. 3, unless otherwise specified, though other implementations are possible without departing from the scope of the present disclosure.

In block 510, the primary coil 207 is activated to generate an electromagnetic field. The primary coil 207 can be activated to a low-power state that generates an electromagnetic field that extends a short distance (e.g., 6 inches) from the primary coil 207. In some examples, the primary coil 207 is activated in response to the receiver 112 being a preset distance (e.g., 5 meters) from the transmitter 102. In additional or alternative examples, the primary coil 207 is activated in response to determining the receiver 112 is aligned with the transmitter 102.

Sensor coils 205a-b can be positioned in the transmitter 102 between the primary coil 207 and the receiver 112. The sensor coils 205a-b can each include a first spiral 302 and a second spiral 304 coupled at a point. The first spiral 302 can be spiraled in a first direction away from the point and the second spiral 304 can be spiraled in a second direction away from the point. A voltage can be induced on each of the sensor coils 205a-b in response to a non-uniform electromagnetic field. The electromagnetic field generated by the primary coil 207 can be distorted in response to a foreign object (e.g., a metallic object) being positioned between the transmitter 102 and the receiver 112.

In block 520, the voltage induced on the sensor coils 205a-b in response to the electromagnetic field is measured. The processing device 204 in the transmitter 102 can be coupled to each of the sensor coils 205a-b at the point between the first spiral 302 and the second spiral 304. The voltage at each of the sensor coils 205a-b can be measured at the point and monitored for variations over time. In some aspects, expected objects (e.g., the electric vehicle) can be positioned in the electromagnetic field and induce a voltage on the sensor coils 205a-b. The processing device 204 can perform a calibration process by activating the primary coil in a controlled environment (e.g., when no foreign objects are between the transmitter 102 and the receiver 112) and measuring a baseline voltage induced on each of the sensor coils 205a-b.

In block 530, a foreign object is determined to be present based on the voltages. In some examples, the sensor coils 205a-b are balanced such that the processing device can determine a foreign object is present by detecting any non-zero voltage on the sensor coils 205a-b. In additional or alternative examples, the processing device 204 can determine a foreign object is present based on a voltage induced on one or more of the sensor coils 205a-b being a predetermined value different from the baseline voltage measured during the calibration process. The processing device 204 can determine the foreign object is positioned between the transmitter 102 and the receiver 112 based on the size of the electromagnetic field generated by the primary coil 207 and the presence of the foreign object in the electromagnetic field. In some aspects, the magnitude of the voltage induced on each of the sensor coils 205a-b can be used by the processing device 204 to determine a size of the foreign object. In additional or alternative aspects, the processing device 204 can determine a location of the foreign object based on a location of the sensor coils 205a-b with a voltage induced by the foreign object.

In some aspects, the processing device 204 can determine the presence of the foreign object based on the sensor coils 205a-b and the radar subsystem 203. For example, the radar subsystem 203 may detect a foreign object as it moves into a position between the transmitter 102 and the receiver 112. In response to the radar subsystem 203 detecting the foreign object, the processing device 204 may activate the primary coil 207 such that the sensor coils 205a-b can be used to detect the foreign object at a position between the transmitter 102 and the receiver 112. In additional or alternative aspects, the processing device 204 can cause retractable cover 118 to open in response to detecting the foreign object. The retractable cover 118 may form a physical barrier for preventing the foreign object from being positioned between the transmitter 102 and the receiver 112.

Figure 6:
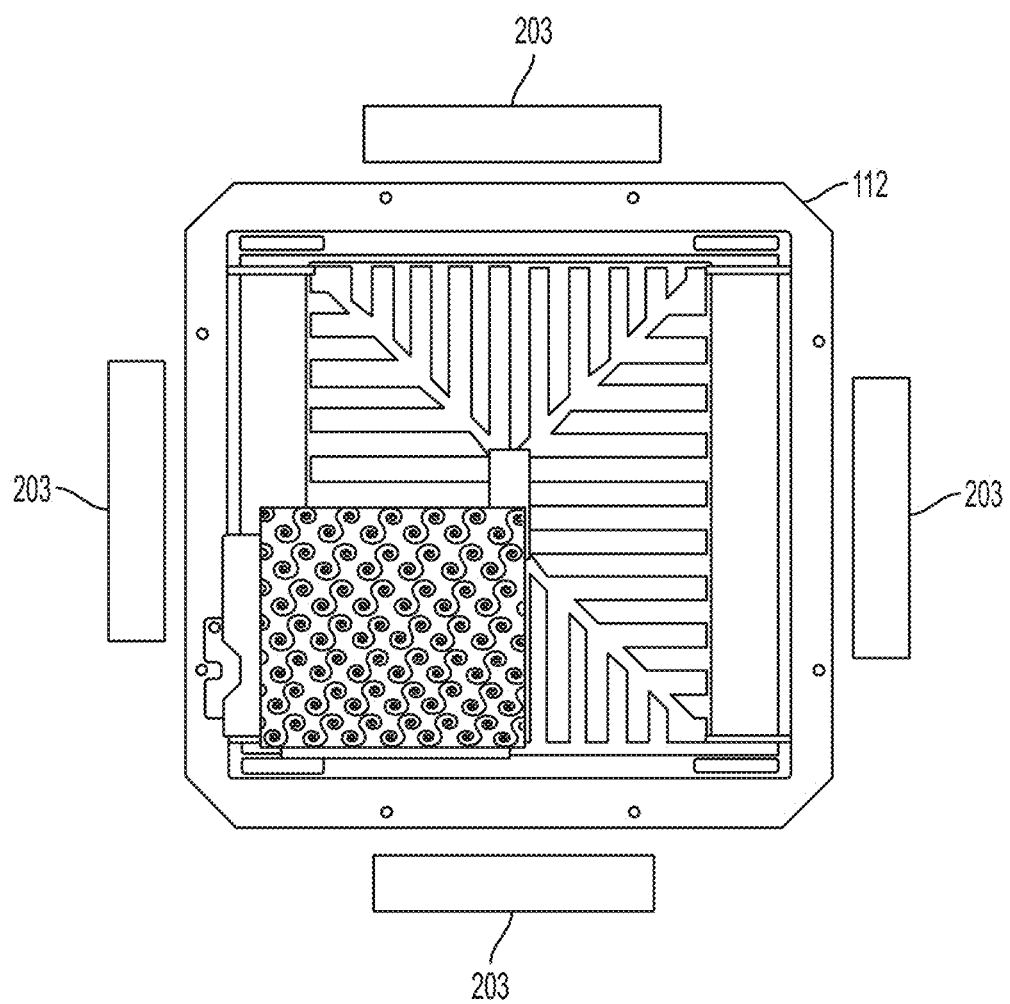
FIG. 6 is a schematic diagram of a transmitter with a radar subsystem according to one aspect of the present disclosure.

FIG. 6 is a schematic diagram of a cross-sectional view of the receiver 112 in FIGS. 1-2 with radar subsystem 203. The receiver 112 can include multiple layers of components within a housing. In some aspects, the radar subsystem 203 can be positioned on each side of the receiver 112. In some aspects, the radar subsystem 203 can include a Doppler radar that uses the Doppler effect to measure movement data about foreign objects. The radar subsystem 203 can transmit a signal toward a foreign object and receive a reflection of the signal generated by the signal contacting the foreign object. The frequency of the reflected signal can be analyzed to determine motion data about the foreign object. In some examples, the radar subsystem 203 can include a processing device that monitors changes in the received reflected signal and determines a direction and velocity the foreign object is moving relative to the radar subsystem 203. In additional or alternative examples, the radar subsystem 203 can be communicatively coupled to the processing device 204 or the processing device 214 for determining movement data regarding the foreign object based on the transmitted signal and the reflected signal.

Although FIG. 6 depicts the radar subsystem 203 positioned around an exterior of the receiver 112, a radar subsystem can be positioned throughout a transmitter, a receiver, or another component in a wireless charging station. In some aspects, a radar subsystem is positioned outside of the transmitter housing and communicatively coupled to the processing device 204. In additional or alternative aspects, a radar subsystem and a double-spiral sensor coil can be included in the transmitter 102. A processing device can use data from both the radar subsystem and the double-spiral sensor coil to detect foreign objects.

Figure 7:
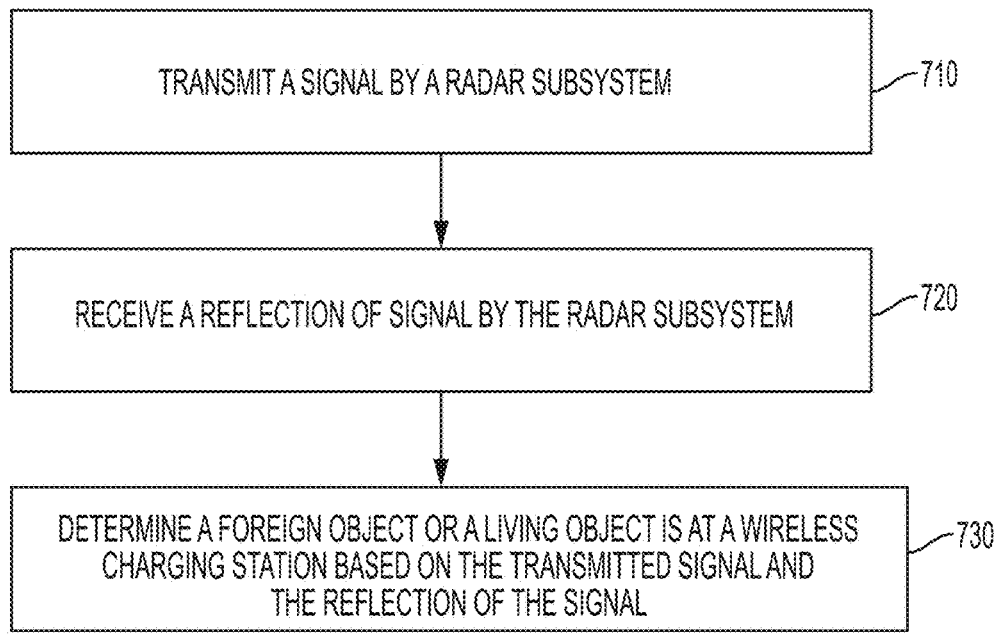
FIG. 7 is a flowchart of an example of a process for detecting foreign objects or living objects at a wireless charging station with a radar subsystem according to one aspect of the present disclosure.

FIG. 7 is a flow chart depicting a process for detecting a foreign object or a living object at a wireless charging station using a radar subsystem. The process is described with respect to the wireless charging station 100 in FIGS. 1-2 and the receiver 112 in FIG. 6, unless otherwise specified, though other implementations are possible without departing from the scope of the present disclosure.

In block 710, the radar subsystem 203 transmits a signal. The radar subsystem 203 can be positioned in the receiver 112 in a wireless charging station. In some examples, the signal is a radio frequency electromagnetic signal having a microwave frequency (e.g., 300 MHz to 300 GHz). The radar subsystem 203 can transmit the signal in a focused direction (e.g., toward an area between the transmitter 102 and the receiver 112) or in multiple directions. In some examples, the radar subsystem 203 can be instructed to transmit the signal in response to the receiver 112 being a predetermined distance from the transmitter 102. In additional or alternative examples, the radar subsystem 203 can transmit the signal at predetermined intervals. A reflection of the signal can be generated in response to the transmitted signal contacting or being received by a foreign object.

In block 720, a reflection of the signal is received by the radar subsystem 203. A frequency of the reflected signal can vary based on a changing distance between the radar subsystem 203 and the foreign object. For example, as the foreign object moves towards the radar subsystem 203 the frequency of the reflected signal can increase.

In block 730, a foreign object or a living object is determined to be at the wireless charging station based on the transmitted signal and the reflection of the signal. The radar subsystem 203 can include or be communicatively coupled to a processing device (e.g., the processing device 204 in the transmitter 102). In some examples, the processing device 204 monitors changes in a frequency of the reflected signal to determine movement data about the foreign object. The processing device 204 can use the movement data to determine a location (e.g., between the transmitter 102 and the receiver 112) of the foreign object.

Figure 14:
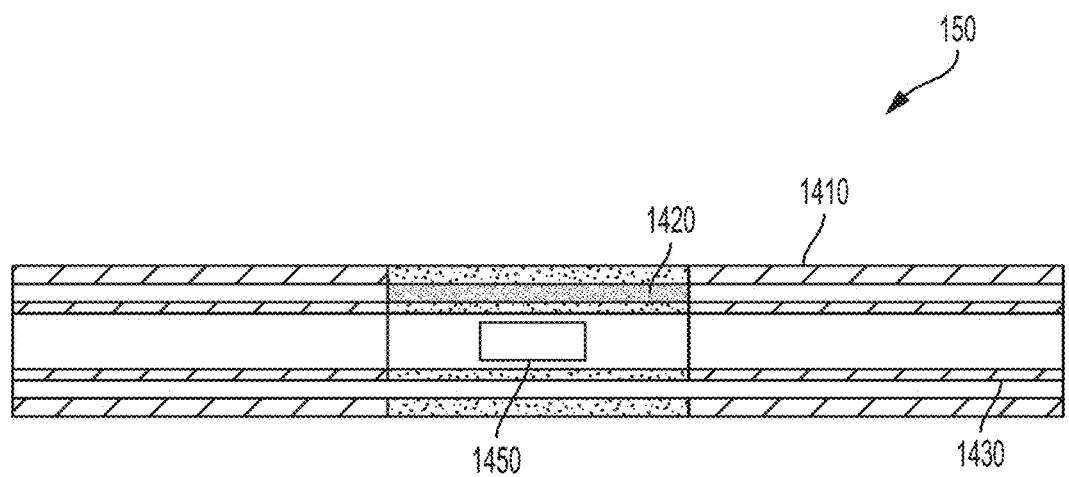
FIG. 14 is a schematic diagram of an example of a cross-section of a camera assembly for detecting foreign objects or living objects according to one aspect of the present disclosure.

FIG. 14 is a schematic diagram of a cross sectional view of the camera assembly 150 in FIGS. 1-2. The camera assembly 150 includes an outer tubular body 1410, a cleaner 1420, an inner tubular body 1430, and an image or thermal capture device 1450. The outer tubular body 1410 can be coupled to an underside of an electric vehicle. The inner tubular body 1430 can be positioned in an inner area of the outer tubular body 1410 such that the inner tubular body 1430 can rotate axially within the outer tubular body 1410. The image or thermal capture device 1450 can be coupled to the inner tubular body such that the image or thermal capture device 1450 rotates with the inner tubular body 1430.

In some examples, the inner tubular body 1430 can rotate between an open position and a closed position. In the open position, the image or thermal capture device 1450 can face away from the electric vehicle such that a field of view of the image or thermal capture device 1450 includes an area around (e.g., beneath) the electric vehicle. In the closed position, the image or thermal capture device 1450 can face towards the electric vehicle. The outer tubular body 1410 and the inner tubular body 1430 can each be made of metal with a plastic portion surrounding a portion in a field of vision of the image or thermal capture device 1450. The plastic portion can allow the image or thermal capture device 1450 to capture images of the environment outside of the camera assembly 150. In some examples, the image or thermal capture device 1450 captures thermal images of the environment outside of the camera assembly 150. In some aspects, the image or thermal capture device 1450 includes a processing device for analyzing images captured of the environment. In additional or alternative aspects, the image or thermal capture device 1450 includes a transceiver (e.g., a wireless transceiver) for communicating the images or data about the images to a wireless charging station.

In additional or alternative examples, the cleaner 1420 can be positioned between an inner surface of the outer tubular body 1410 and an outer surface of the inner tubular body 1430. The cleaner 1420 can be coupled to the outer tubular body 1410 such that as the inner tubular body 1430 rotates the cleaner 1420 cleans the portion of the inner tubular body 1430 in the field of view of the image or thermal capture device 1450. In some examples, the cleaner 1420 is a rubber flap that scraps dirt and debris from the inner tubular body.

Although FIG. 14 depicts the image or thermal capture device 1450 positioned in a camera assembly 150 for coupling to an electric vehicle, a image or thermal capture device 1450 can be positioned in the transmitter 102 or another component in the wireless charging station 100. A processing device can use data from a camera assembly, the radar subsystem, and the double-spiral sensor coil to detect foreign objects.

Figure 15:
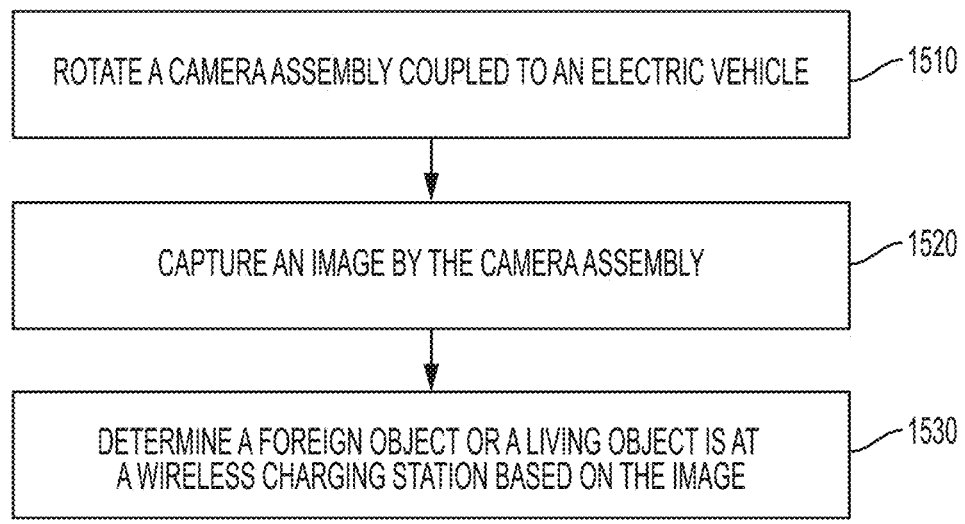
FIG. 15 is a flow chart of an example of a process for detecting foreign objects or living objects at a wireless charging station with a camera assembly according to one aspect of the present disclosure.

FIG. 15 is a flow chart depicting a process for detecting a foreign object or a living object at a wireless charging station using a camera assembly. The process is described with respect to the wireless charging station 100 in FIGS. 1-2 and the camera assembly 150 in FIG. 14, unless otherwise specified, though other implementations are possible without departing from the scope of the present disclosure.

In block 1510, the camera assembly 150 rotates from a closed position to an open position. The camera assembly 150 can include a motor that activates in response to an electric vehicle being positioned within a predetermined distance from the wireless charging station 1100. In the closed position, the camera assembly 150 may be protected from road debris. In the open position, the field of view of the image or thermal capture device 1450 may include an area between the transmitter 102 and the receiver 112.

In block 1520, the camera assembly 150 captures an image of the area between the transmitter 102 and the receiver 112. In some aspects, the camera assembly 150 captures a visual image within a field of vision of the image or thermal capture device 1450. The image or thermal capture device 1450 can capture images as the camera assembly 150 rotates such that the image or thermal capture device 1450 captures images of an area greater than the field of vision. In additional or alternative aspects, the camera assembly 150 captures thermal images using infrared to detect temperatures in the field of vision of the image or thermal capture device 1450.

In block 1530, a foreign object or a living object is determined to be at the wireless charging station based on the image captured by the camera assembly 150. The camera assembly 150 can include or be communicatively coupled to a processing device (e.g., the processing device 204 in the transmitter 102). In some aspects, the processing device 204 performs image processing on the image to determine a foreign object is in the area between the transmitter 102 and the receiver 112. In additional or alternative aspects, the processing device 204 monitors changes between images captured by the camera assembly 150 to determine changes in temperature in the area between the transmitter 102 and the receiver 112. The processing device 204 can use the changes in temperature to determine a location (e.g., between the transmitter 102 and the receiver 112) of a foreign object. In some examples, the processing device 204 can detect a metal object heating up in response to being positioned in an electromagnetic field generated by the transmitter 102. In additional or alternative examples, the processing device 204 can detect a living object with a higher natural temperature than the environment based on a temperature signature associated with the living object moving through the environment.

Figure 8:
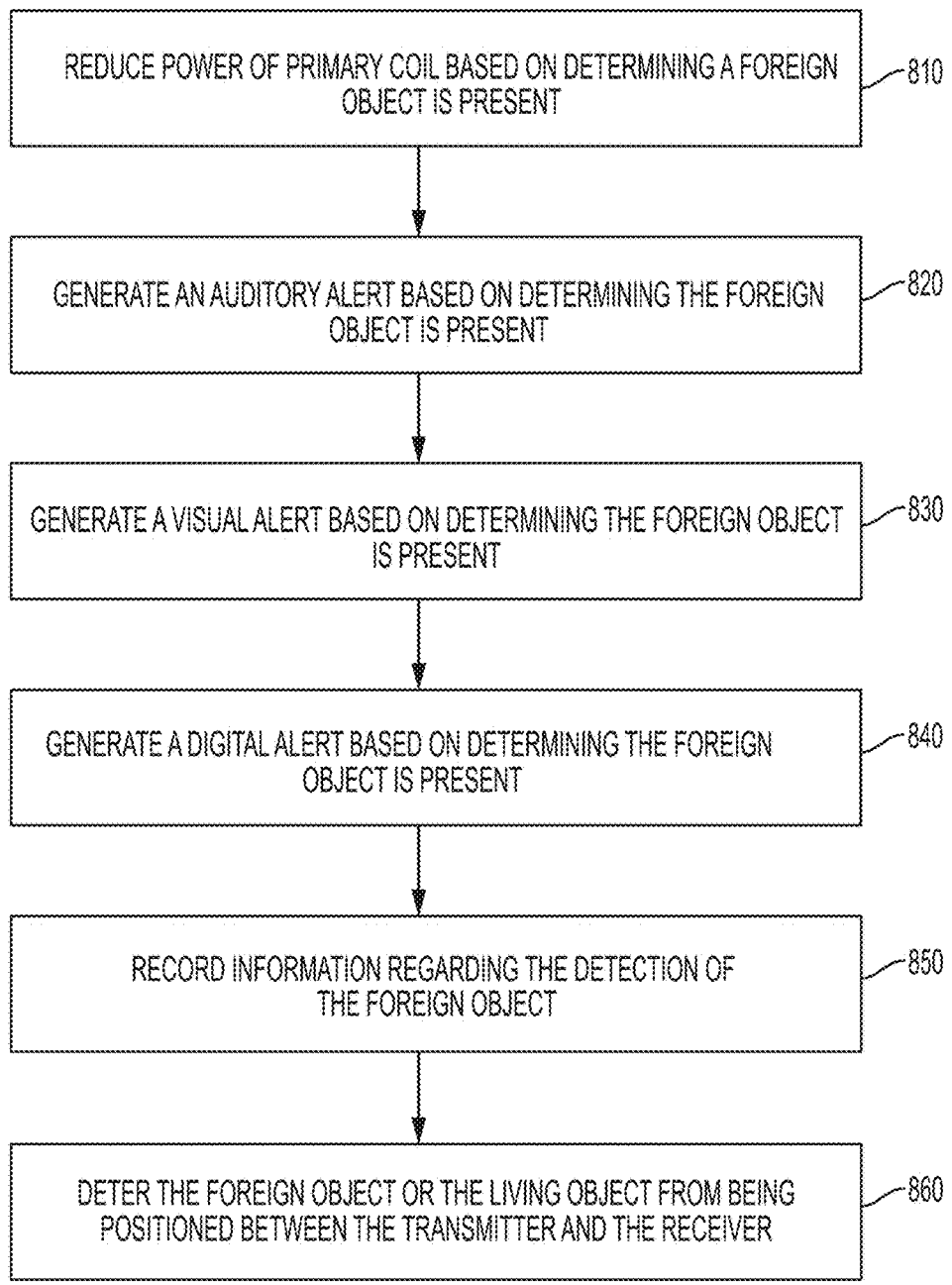
FIG. 8 is a flowchart of an example of a process for responding to foreign objects or living objects at a wireless charging station according to one aspect of the present disclosure.

FIG. 8 is a flow chart depicting a process for responding to a foreign object being present at a wireless charging station. The process is described with respect to the wireless charging station 100 in FIGS. 1-2, unless otherwise specified, though other implementations are possible without departing from the scope of the present disclosure.

In block 810, a power level of the primary coil 207 is reduced based on determining a foreign object is present. A foreign object can be detected during a charging process in which the primary coil 207 is powered to a high-power state. The processing device 204 can reduce the power to the primary coil 207 or deactivate the primary coil 207 to reduce power loss by the wireless charging station while the foreign object is between the transmitter 102 and the receiver 112.

In block 820, an auditory alert is generated based on determining the foreign object is present. In some examples, the transmitter 102 can include a piezoelectric device for outputting an auditory alert (e.g., a horn or a siren) to indicate a foreign object is at the wireless charging station. The processing device 204 can transmit a signal to the piezoelectric device for causing the piezoelectric device to create the auditory alert. In additional or alternative examples, an auditory alert can be generated by a component positioned in (or coupled to) the inverter enclosure 104, receiver 112, mobile device 120, or the electric vehicle associated with the receiver 112. For example, the processing device 204 can transmit a signal to a communication system (e.g., a car horn or a radio) coupled to the electric vehicle for causing the communication system to produce the auditory alert. In some aspects, the auditory alert can include information such as the size, shape, and location of the foreign object. In additional or alternative aspects, the auditory alert can instruct a user to remove the foreign device or indicate a wait time for the removal of the foreign object.

In block 830, a visual alert is generated based on determining the foreign object is present. The visual alert can be generated by any light source such as LEDs 109 coupled to the transmitter 102, LEDs 105 coupled to the inverter enclosure 104, a display on the mobile device 120, or a lighting system of the electric vehicle. For example, the processing device 204 can activate LEDs 105, 109 to flash at a predetermined rate, color, or intensity to indicate that a foreign object is positioned at the wireless charging station. In some examples, the rate, color, or intensity of the LEDs 105, 109 can indicate a size, shape, and location of the foreign object.

In block 840, a digital alert is generated based on determining the foreign object is present. The processing device 204 can generate and transmit a digital alert to the mobile device 120 or a communication system in the electric vehicle. In some examples, the digital alert can include a text message, e-mail, or an automated call. The digital alert can be transmitted to the server 130 and transmitted to the mobile device 120 over the network 140 to update a user interface being displayed on the mobile device 120. In additional or alternative examples, the electric vehicle can be an autonomous vehicle and the digital alert can be transmitted to the autonomous vehicle to instruct the autonomous vehicle to wait for the removal of the foreign object or move to another charging station.

In block 850, information regarding the detection of the foreign object is recorded. In some examples, the processing device 204 can transmit information to the server 130 for storing the information in a database. The server 130 can maintain information on multiple charging stations and notify operators about charging stations that detect foreign objects more often. The information can include the time the foreign object was detected, the type (e.g., living object or metallic object) of foreign object, the time to remove the foreign object, or a user associated with the receiver 112. In some examples, the server can analyze the information and instruct operators to provide solutions for preventing foreign objects at particular charging station.

In block 860, the foreign object or the living object is deterred from remaining between the transmitter 102 and the receiver 112. In some examples, the processing device 204 can transmit instructions to an air jet 217 to blow air at a position of the foreign object. The air jet 217 can generate a stream of air that physically displaces the foreign object and clears the area between the transmitter 102 and the receiver 112. In additional or alternative examples, the auditory alert, visual alert, or digital alert may deter the foreign object from remaining between the transmitter 102 and the receiver 112.

Figure 9:
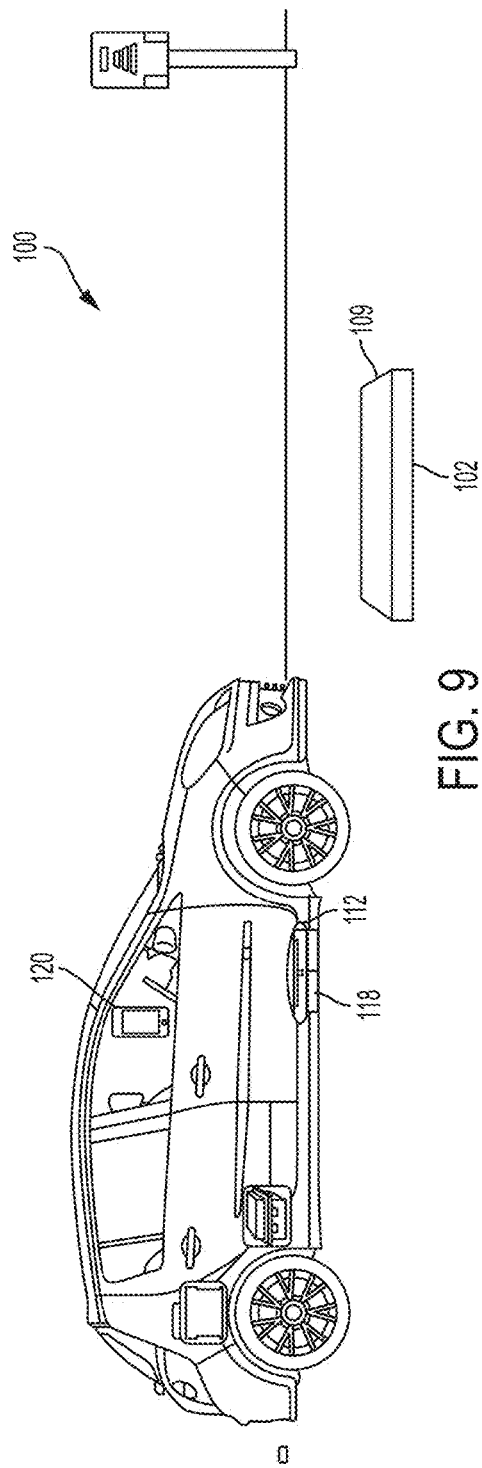
FIG. 9 is a schematic diagram of a wireless charging station with a closed retractable cover according to one aspect of the present disclosure.
Figure 10:
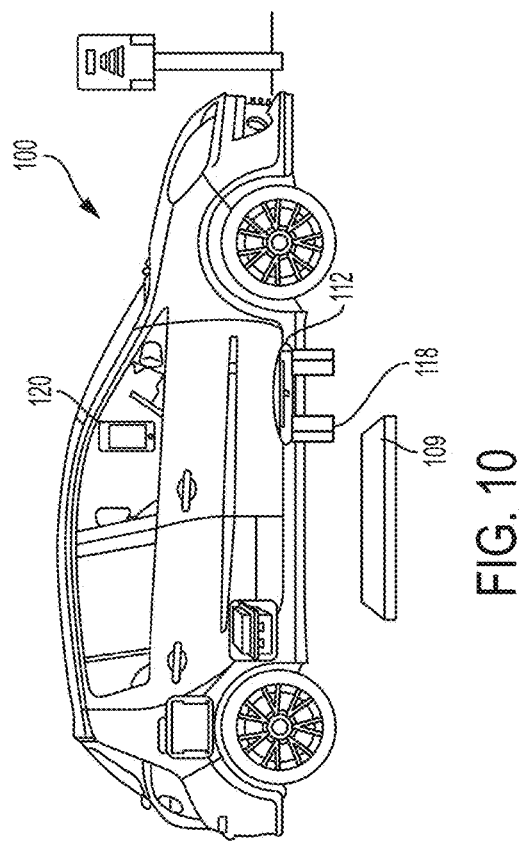
FIG. 10 is a schematic diagram of a wireless charging station with an open retractable cover according to one aspect of the present disclosure.

FIGS. 9-10 depict the wireless charging station 100 in FIG. 1 with retractable cover 118 in a closed position and an open position respectively. FIG. 9 depicts the receiver 112 being more than a preset distance from the transmitter 102. The retractable cover 118 included in (or coupled to) the receiver 112 is in a closed position protecting the receiver 112 from road debris. The surface of the transmitter 102 can include LEDs 109 that are visible by a user in the electric vehicle associated with the receiver 112. The LEDs 109 can activate to indicate the transmitter 102 is available or that a foreign object is detected proximate to the transmitter 102 (e.g., in an area that can be used by the transmitter 102 for charging the receiver 112).

FIG. 10 depicts the receiver 112 being less than the preset distance from the transmitter 102. The retractable cover 118 is in an open position creating a barrier for deterring and preventing foreign objects from being positioned between the transmitter 102 and the receiver 112. In some aspects, the retractable cover 118 can pivot from the closed position to the open position in response to the receiver 112 being less than the preset distance from the transmitter 102. In some aspects, the retractable cover 118 can move to the open position in response to a foreign object being detected by a double-spiral sensor coil or a radar subsystem. In additional or alternative aspects, the LEDs 109 can provide visual indicators to a user regarding a foreign object positioned in the area between the transmitter 102 and the receiver 112. In some aspects, the LEDs can strobe to deter foreign objects (e.g., animals or children) from approaching the area between the transmitter 102 and the receiver 112.

Although the retractable cover 118 in FIGS. 9-10 is depicted as including two retractable portions, a wireless charging station can include any number or shape of retractable portions. In some examples, the retractable cover 118 can couple to a retractable cover coupled to the transmitter 102 to form a sealed barrier around the area between the transmitter 102 and the receiver 112. In additional or alternative examples, retractable covers can move perpendicularly in relation to a transmitter and remain in the same plane in both the open position and the closed position. In some aspects, the retractable covers 118 can be coated with a material that is shock absorbent and waterproof.

In some examples, the retractable cover 118 returns to the closed position in response to the charging process being completed. In additional or alternative examples, the retractable cover 118 moves to the closed position in response on the receiver 112 being more than a preset distance from the transmitter 102 or in response to instructions transmit from the mobile device 120.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method comprising:
    activating a primary coil in a transmitter to generate an electromagnetic field in response to a receiver being positioned within a predetermined distance from the primary coil, the receiver being coupled to a battery in an electric vehicle for wirelessly receiving power from the transmitter for charging the battery;
    measuring a voltage induced on a sensor coil in response to a foreign object being positioned within the electromagnetic field, the sensor coil comprising a first spiral coupled to a second spiral at a point, the first spiral being spiraled in a first direction away from the point and the second spiral being spiraled in a second direction away from the point;
    determining the foreign object is between the transmitter and the receiver based on the voltage; and
    recording information in a server, the information including a time that the foreign object is determined to be between the transmitter and the receiver.

2. The method of claim 1, further comprising:
    transmitting a signal using a radar subsystem;
    receiving a reflection of the signal using the radar subsystem, the reflection being generated by the signal contacting the foreign object; and
    determining movement data about the foreign object based on a difference in the signal and the reflection, and
    wherein determining the foreign object is between the transmitter and the receiver is further based on the movement data.

3. The method of claim 1, further comprising:
    capturing an image of an area between the primary coil and the receiver;
    determining thermal data about the foreign object based on the image, and
    wherein determining the foreign object is between the transmitter and the receiver is further based on the thermal data.

4. The method of claim 1, further comprising reducing a power level of the primary coil from a first power level to a second power level in response to determining the foreign object is between the transmitter and the receiver, wherein the second power level of the primary coil permits detection of a change in a location of the foreign object while using less power than the first power level.

5. The method of claim 1, further comprising:
    opening a retractable cover positioned between the transmitter and the receiver in response to the receiver being positioned within a preset distance from the primary coil, the retractable cover being part of a surface between the transmitter and the receiver such that opening the retractable cover prevents the foreign object from being positioned on the surface between the transmitter and the receiver.

6. The method of claim 1, further comprising outputting an auditory alert using a piezoelectric device in response to determining the foreign object is between the transmitter and the receiver, the auditory alert for notifying a user of the foreign object or for deterring the foreign object from remaining between the transmitter and the receiver.

7. The method of claim 1, further comprising outputting a visual alert using a light source in response to determining the foreign object is between the transmitter and the receiver, the visual alert for notifying a user of the foreign object or for deterring the foreign object from remaining between the transmitter and the receiver.

8. The method of claim 1, further comprising transmitting a digital alert using a communication device in response to determining the foreign object is between the transmitter and the receiver, the digital alert for being received by a mobile device associated with the receiver and notifying a user of the foreign object.

9. The method of claim 1 wherein the information further includes a location of the transmitter, and a type of foreign object, the method further comprising analyzing the information associated with the transmitter to determine the transmitter is being impacted by foreign objects at a frequency above a threshold value based on other transmitters.

10. The method of claim 1, wherein the sensor coil comprises a plurality of sensor coils, wherein measuring the voltage induced on the sensor coil comprises measuring the voltage induced on each sensor coil of the plurality of sensor coils positioned on a single plane parallel to the primary coil.

11. A system comprising:
a sensor coil comprising a first spiral and a second spiral coupled at a point, the first spiral being spiraled in a first direction away from the point and the second spiral being spiraled in a second direction away from the point, the sensor coil being configured for detecting a foreign object between a primary coil of a wireless electric vehicle charging station and a receiver of an electric vehicle; and
a server operable to record information about the foreign object in response to the sensor coil detecting the foreign object, the information including a time that the foreign object is detected.

12. The system of claim 11, further comprising:
a transmitter including:
the primary coil for producing an electromagnetic field; and
the sensor coil; and
a processing device communicatively coupled to the transmitter; and
a memory device on which instructions are stored for causing the processing device to:
activate the primary coil to in response to the receiver being positioned within a predetermined distance from the transmitter;
measure a voltage induced on the sensor coil in response to the foreign object being positioned within the electromagnetic field; and
determine the foreign object is between the transmitter and the receiver based on the voltage.

13. The system of claim 12, further comprising a radar subsystem communicatively coupled to the processing device for measuring movement data about the foreign object, wherein the instructions are further for causing the processing device to determine the foreign object is between the transmitter and the receiver based on the voltage and the movement data.

14. The system of claim 12, further comprising a camera assembly communicatively coupled to the processing device for measuring thermal data about the foreign object, wherein the instructions are further for causing the processing device to determine the foreign object is between the transmitter and the receiver based on the voltage and the thermal data.

15. The system of claim 12, wherein the instructions are further for causing the processing device to deactivate the primary coil in response to determining the foreign object is between the transmitter and the receiver.

16. The system of claim 12, wherein the system further comprises a retractable cover coupled to the receiver, the retractable cover being positionable in a first position between the transmitter and the receiver and movable to a second position in response to the receiver being positioned within a preset distance from the receiver to prevent the foreign object from being positioned between the transmitter and the receiver.

17. The system of claim 12, wherein the system further comprises a piezoelectric device for outputting an auditory alert, wherein the instructions are further for causing the processing device to transmit a signal to the piezoelectric device in response to determining the foreign object is between the transmitter and the receiver for causing the piezoelectric device to create the auditory alert.

18. The system of claim 12, wherein the system further comprises a light emitting diode (LED) array for outputting a visual alert that includes flashing individual LEDs of the LED array to deter the foreign object from remaining between the transmitter and the receiver, wherein the instructions are further for causing the processing device to transmit a signal to the LED array in response to determining the foreign object is between the transmitter and the receiver for causing the LED array to create the visual alert.

19. The system of claim 12, wherein the system further comprises a communication device communicatively coupled to the processing device for transmitting a digital alert to a mobile device associated with the receiver, wherein the instructions are further for causing the processing device to transmit a signal to the communication device in response to determining the foreign object is between the transmitter and the receiver for causing the communication device to transmit the digital alert.

20. The system of claim 12, wherein the server is coupled to the processing device for recording the information about the foreign object, wherein the instructions are further for causing the processing device to transmit a signal to the server for instructing the server to record the information.

21. The system of claim 12, wherein the sensor coil is three-dimensional, the first spiral and the second spiral being substantially perpendicular to a plane parallel to the primary coil and the sensor coil aligned with a litz wire of the primary coil.

22. The system of claim 11, wherein the sensor coil comprises a plurality of sensor coils, each sensor coil positioned on a single plane parallel to the primary coil and aligned with a litz wire of the primary coil.

23. A non-transitory computer-readable medium in which instructions executable by a processing device are stored for causing the processing device to:
activate a primary coil in a transmitter to generate an electromagnetic field in response to a receiver being positioned within a predetermined distance from the primary coil;
measure a voltage induced on a sensor coil in response to a foreign object being positioned within the electromagnetic field, the sensor coil comprising a first spiral and a second spiral, the first spiral being spiraled in a first direction away from the point and the second spiral being spiraled in a second direction away from the point; and determine the foreign object is between the transmitter and the receiver based on the voltage; and record information in a server, the information including a time that the foreign object is determined to be between the transmitter and the receiver.

24. The non-transitory computer-readable medium of claim 23, the non-transitory computer-readable medium further comprising additional instructions executable by the processing device for causing the processing device to determine movement data about the foreign object using a radar subsystem, wherein the instructions are executable by the processing device for further causing the processing device to determine the foreign object is between the transmitter and the receiver based on the voltage and the movement data.

25. The non-transitory computer-readable medium of claim 23, the non-transitory computer-readable medium further comprising additional instructions executable by the processing device for causing the processing device to reduce a power level of the primary coil in response to causing the processing device to determine the foreign object is between the transmitter and the receiver.

26. The non-transitory computer-readable medium of claim 23, the non-transitory computer-readable medium further comprising additional instructions executable by the processing device for causing the processing device to open a retractable cover positionable between the transmitter and the receiver in response to the receiver being positioned within a preset distance from the primary coil, the retractable cover being part of a surface between the transmitter and the receiver such that opening the retractable cover prevents the foreign object from being positionable on the surface between the transmitter and the receiver.

27. The non-transitory computer-readable medium of claim 23, the non-transitory computer-readable medium further comprising additional instructions executable by the processing device for causing the processing device to create an auditory alert using a piezoelectric device in response to causing the processing device to determine the foreign object is between the transmitter and the receiver, the auditory alert notifying a user of the foreign object or deterring the foreign object from remaining between the transmitter and the receiver.

28. The non-transitory computer-readable medium of claim 23, the non-transitory computer-readable medium further comprising additional instructions executable by the processing device for causing the processing device to create a visual alert using a light source in response to causing the processing device to determine the foreign object is between the transmitter and the receiver, the visual alert notifying a user of the foreign object or deterring the foreign object from remaining between the transmitter and the receiver.

29. The non-transitory computer-readable medium of claim 23, wherein the information further includes an identifier of the transmitter, and wherein the non-transitory computer-readable medium further comprising additional instructions executable by the processing device for causing the processing device to transmit a digital alert using a communication device in response to causing the processing device to determine the foreign object is between the transmitter and the receiver, the digital alert being receivable by a mobile device associated with the receiver for notifying a user of the foreign object.

30. The non-transitory computer-readable medium of claim 23, wherein the sensor coil comprises a plurality of sensor coils, wherein causing the processing device to measure the voltage induced on the sensor coil includes measuring the voltage induced on each of the plurality of sensor coils positionable on a single plane parallel to the primary coil.

\* \* \* \* \*